United States Patent
Oldiges et al.

(10) Patent No.: US 12,107,222 B2
(45) Date of Patent: Oct. 1, 2024

(54) LIQUID ELECTROLYTE COMPRISING ORGANIC CARBONATES AND CYCLIC SULFOXIDES FOR APPLICATIONS IN LITHIUM SECONDARY BATTERIES

(71) Applicant: Forschungszentrum Juelich GmbH, Juelich (DE)

(72) Inventors: Kristina Oldiges, Muenster (DE); Gunther Brunklaus, Muenster (DE); Mariano Gruenebaum, Nordkirchen (DE); Isidora Cekic-Laskovic, Muenster (DE); Martin Winter, Muenster (DE)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 817 days.

(21) Appl. No.: 17/259,958

(22) PCT Filed: Jul. 20, 2019

(86) PCT No.: PCT/DE2019/000195
§ 371 (c)(1),
(2) Date: Jan. 13, 2021

(87) PCT Pub. No.: WO2020/035098
PCT Pub. Date: Feb. 20, 2020

(65) Prior Publication Data
US 2021/0313623 A1    Oct. 7, 2021

(30) Foreign Application Priority Data
Aug. 11, 2018   (DE) ..................... 10 2018 006 379.9

(51) Int. Cl.
H01M 10/0567    (2010.01)
H01M 4/38       (2006.01)
(Continued)

(52) U.S. Cl.
CPC ......... *H01M 10/0567* (2013.01); *H01M 4/38* (2013.01); *H01M 4/583* (2013.01);
(Continued)

(58) Field of Classification Search
None
See application file for complete search history.

(56) References Cited

U.S. PATENT DOCUMENTS 6,265,109 B1    7/2001  Yamamoto et al.
2004/0110068 A1 6/2004  Seki et al.
(Continued)

FOREIGN PATENT DOCUMENTS

CN    1543005 A    11/2004
CN  101803101 A     8/2010
(Continued)

OTHER PUBLICATIONS

Michael S. Ding, et al., "Properties of PC-EA Solvent and its solution of LiBOB Comparison of Linear Esters to Linear Carbonates for Use in Lithium Batteries", Journal of the Electrochemical Society, May 5, 2005, pp. A1199-A1207, vol. 152, No. 6, Army Research Laboratory, Adelphi, Maryland, USA.
(Continued)

*Primary Examiner* — Lucas J. O'Donnell
(74) *Attorney, Agent, or Firm* — LEYDIG, VOIT & MAYER, LTD.

(57) ABSTRACT

Disclosed is a liquid electrolyte for use in lithium-ion, lithium-metal, and lithium-sulfur batteries, in which the liquid electrolyte comprises at least one organic nonlinear carbonate, at least one lithium salt, and at least one cyclic sulfoxide, and in which the liquid electrolyte does not comprise a combination of propylene carbonate, tetrahydrothiophene-1-oxide, and lithium bis(trifluoromethanesulfonyl)imide (LiTFSI). Also disclosed is a lithium secondary
(Continued)

battery comprising an anode, a cathode, a separator, and the liquid electrolyte for use in lithium-ion, lithium-metal, and lithium-sulfur batteries.

21 Claims, 12 Drawing Sheets

(51) Int. Cl.
    *H01M 4/583* (2010.01)
    *H01M 10/0525* (2010.01)
    *H01M 10/0568* (2010.01)
    *H01M 10/0569* (2010.01)

(52) U.S. Cl.
    CPC ... *H01M 10/0525* (2013.01); *H01M 10/0568* (2013.01); *H01M 10/0569* (2013.01); *H01M 2300/0028* (2013.01)

(56) References Cited

U.S. PATENT DOCUMENTS

| | | | |
|---|---|---|---|
| 2004/0214091 A1 | 10/2004 | Lim et al. | |
| 2005/0019670 A1* | 1/2005 | Amine | H01M 10/0567 429/231.1 |
| 2006/0024587 A1 | 2/2006 | Tamura et al. | |
| 2008/0193855 A1 | 8/2008 | Mcdonald | |
| 2010/0266905 A1 | 10/2010 | Jeon et al. | |
| 2014/0255796 A1 | 9/2014 | Matsuoka et al. | |
| 2015/0044551 A1* | 2/2015 | Taki | H01M 10/052 429/188 |

FOREIGN PATENT DOCUMENTS

| | | |
|---|---|---|
| CN | 103367801 A | 10/2013 |
| CN | 105449279 A | 3/2016 |
| JP | H0878052 A | 3/1996 |
| JP | 2005327566 A | 11/2005 |
| JP | 201040737 A | 6/2010 |

OTHER PUBLICATIONS

"Propylencarbonat Safety Data Sheet No. 310328", Nov. 25, 2014, pp. 1-9, Sigma-Aldrich Chemie GmbH, Steinheim, Germany.

W.H. Lee, "Cyclic Carbonates" The Chemistry of Nonaqueous Solvents, ed. J.J. Logowski, Dec. 1976, p. 168, vol. 4, New York, USA.

Oleg Borodin, et al., "Development of Many-Body Polarizable Force Fields for Li-Battery Components: 1 Ether, Alkane, and Carbonate-Based Solvents", J. Phys. Chem. B, Jan. 3, 2006, pp. 6279-6292, vol. 110, No. 12, American Chemical Society, Washington, USA.

Sheng Shui Zhang, "A review on electrolyte additives for lithium-ion batteries", Journal of Power Sources, Oct. 10, 2006, pp. 1379-1394, , vol. 162, Elsevier, Amsterdam, Netherlands.

"1, 3-propanselutone", European Chemicals Agency (ECHA), Jun. 8, 2018, p. 1, European Chemicals Agency, Helsinki, Finland.

"Vinylene carbonate", European Chemicals Agency (ECHA), Jun. 15, 2018, p. 1, European Chemicals Agency, Helsinki Finland.

Hui Zhao, et al., "Propylene Carbonate (PC)-Based Electrolytes with High Coulombic Efficiency for Lithium-Ion Batteries", Journal of Electrochemical Society, Dec. 10, 2013, pp. A194-A200, vol. 161, No. 1, Lawrence Berkeley National Laboratory, Berkeley, California, USA.

Rene Schmitz, et al., "Methyl tetrafluoro-2-(methoxy) propionate as co-solvent for propylene carbonate-based electrolytes for lithium-ion batteries" Journal of Power Sources, Jan. 9, 2021, pp. 408-413, vol. 205, Elsevier, Amsterdam, Netherlands.

Hiroyoshi Nakamura, et al., "Suppression of electrochemical decomposition of propylene carbonate at a graphite anode in lithium-ion cells", Journal of Power Sources, Mar. 13, 1996, pp. 219-222, vol. 62, Elsevier, Amsterdam, Netherlands.

Yue Pan, et al., "Cycling performance and surface analysis of Lithium biy (trifluoromethanesulfonyl)imide in propylene carbonate with graphite", Electrochemica Acta, Sep. 17, 2016, pp. 269-273, vol. 217, Elsevier, Amsterdam, Netherlands.

"Ethylenecarbonat Safety Data Sheet No. E26258", Jun. 19, 2018, pp. 1-8, Sigma-Aldrich Chemie GmbH, Steinheim, Germany.

"1-2-Butylencarbonat Safety Data Sheet No. 844007", Feb. 19, 2014, pp. 1-8, Merck KGaA, Darmstadt, Germany.

"Tetrahydrothiophene 1-oxide Safety Data Sheet No. T22403", Jul. 12, 2012, pp. 1-6, Sigma-Aldrich Chemie GmbH, Steinheim, Germany.

Yunxian Qian, et al., "Investigations on the electrochemical decomposition of the electrolyte additive vinylene carbonate in Li metal half cells and lithium ion full cells", Journal of Powers, Sep. 25, 2016, pp. 60-71, vol. 332, Elsevier, Amsterdam, Netherlands.

M. Zhu, et al., "Particle interaction and aggregation in cathode material of Li-ion batteries: a numerical study", Journal of the Electrochemical Society, Aug. 16, 2011, pp. A1155-A1159, vol. 158, No. 10, Electrochemical Society, Philadelphia, Pennsylvania, USA.

Kristina Oldiges, et al., "Five-Membered Cyclic Sulfur Compounds as (Co-)Solvents for Lithium-Ion Battery Electrolytes", ECS Meeting Abstracts, AiMES 2018 Meeting, Sep. 30, 2018-Oct. 4, 2018, pp. 1-3, Electrochemical Society, Philadelphia, Pennsylvania, USA.

\* cited by examiner

LIQUID ELECTROLYTE COMPRISING ORGANIC CARBONATES AND CYCLIC SULFOXIDES FOR APPLICATIONS IN LITHIUM SECONDARY BATTERIES

CROSS-REFERENCE TO PRIOR APPLICATIONS

This application is a U.S. National Phase application under 35 U.S.C. § 371 of International Application No. PCT/DE2019/000195, filed Jul. 20, 2019, and claims benefit to German Patent Application No. DE 10 2018 006 379.9, filed Aug. 11, 2018. The International Application was published in German on Feb. 20, 2020 as WO 2020/035098 under PCT Article 21(2).

FIELD

The invention relates to novel non-aqueous liquid electrolytes which can be used in lithium-ion, lithium-metal and lithium-sulfur batteries and which comprise non-linear organic carbonates, such as propylene carbonate, as solvents.

BACKGROUND

Nowadays, the non-aqueous aprotic electrolytes used in most commercial rechargeable lithium-ion batteries include organic carbonates such as ethylene carbonate (EC) and dimethyl carbonate (DMC), and lithium hexafluorophosphate as the conducting salt. Apart from the high relative permittivity of EC, the associated good ion solvation and salt dissociation and the ability to form protective layers on carbon-based electrodes, such as graphite, EC-based electrolytes have a decisive disadvantage. The high melting point of EC ($T_m$=36.6° C.)[1] results in low battery power at low temperatures, so linear carbonates such as dimethyl carbonate (DMC) are needed as co-solvents because they have low viscosities and thus facilitate ion transport. In principle, the high volatility and flammability of the linear carbonates lead to a safety risk. It is therefore necessary to look for alternative solvents, especially with regard to larger-scale applications, such as stationary energy storage systems, which are a growing part of the network infrastructure as decentralized energy generation increases. The requirements for the safety of the batteries are very high, especially for private households.

Alternative solvents should have high relative permittivities to allow high solubility and dissociation of the lithium salt, and also be able to form stable protective layers on the electrodes, an anode protective layer (solid electrolyte interphase, SEI) and a cathode electrolyte interphase (CEI), both of which are well permeable to Li ions but electronically insulating to prevent irreversible oxidation of the solvent at the cathode and irreversible reduction at the anode. At the same time, the solvent should be liquid in a wide temperature window (at least $\Delta T$=−20-80° C.). To this end, it would be desirable for the electrolytes to have ionic conductivities in the range of at least 5-8 mS·cm$^{-1}$ at 20° C., despite the absence of linear carbonates, to ensure adequate ion transport. This is important in order to enable reversible capacitances and a high calendar life of a battery due to lower polarization effects.

Propylene carbonate (PC), like EC, belongs to the cyclic carbonates and has a high relative permittivity ($\varepsilon_Y$=66.2 at 20° C.) and also a high flash point ($T_F$=116° C.)[2]. The low melting point and high boiling point ($\Delta T$=−49-242° C.)[3] lead to excellent performance (reversible capacities, long lifetime) at low temperatures, eliminating the need to add linear carbonates, which usually makes the battery much safer and interesting for large-scale applications. However, the previous use of propylene carbonate as electrolyte solvent in lithium-ion batteries has been made more difficult since the substance is incapable of forming stable protective layers on the electrodes on its own and is thus incompatible with electrode materials such as graphite. The use of propylene carbonate results in the exfoliation of graphite. In addition, propylene carbonate has a relatively high viscosity of 2.3 mPa·s, which hinders ion transport, despite the wide temperature window. Comparison: DMC has a viscosity of 0.5 mPa·s at 30° C.[4]

Both additives and co-solvents can be used to make propylene carbonate applicable. Additives are usually substances that make up to 5 wt. % or vol. % of the solvent.[5] In the case of higher proportions, they are referred to as co-solvents. A distinction is drawn between reduction additives and reaction additives. Reduction additives have a higher reduction potential than the solvent. The additives are reduced in the first charging cycle before solvent reduction occurs. In this process, they form insoluble products that are deposited on the surface of the electrodes and form protective layers. Thus, additives that have reduction potentials of >0.8 V vs. Li/Li$^+$ can be considered for propylene carbonate. These can be further subdivided into polymerizing and reducing substances. Polymerizing substances have one or more carbon-carbon bonds and form a protective layer by electrochemically induced polymerization. The following molecules with vinyl groups have already been used, for example, with propylene carbonate:

Vinylene carbonate (VC),
Vinyl acetate (VA),
Vinylethylene carbonate (VEC),
Vinyl ethylene sulfite (VES),
Vinyltrithiocarbonate (VTC),
2-Cyanofuran (2CF),
Acrylonitrile (AN),
Divinyl adipate (ADV),
Allyl methyl carbonate (AMC),
N-vinyl-2-pyrrolidone (NVP)

Reducing substances help in SEI formation in that the reduction products of the additives have a high affinity for the active centers of the graphite and aggregate there. Most representatives of this class are sulfur-based substances. The following additives were used, for example, with propylene carbonate:

Ethylene sulfite (ES),
Propylene sulfite (PS),
Prop-1-ene-1,3-sultone (PES),
Ethylene sulfate (DTD),
1.3-propane sultone (1.3.-PS),
Butylen sulfite (BS),
Polysulfides $S_x^{2-}$ Previous data suggest that the effectiveness of the additives increases with the sulfur content in the molecule. However, the concentration of the aforementioned sulfur-based additives should be kept low because they are anodically unstable at high potentials (>4.2 V vs. Li/Li$^+$) and an internal redox shuttle can lead to high self-discharge rates.[5]

Other reducing additives that have been used with propylene carbonate include fluoroethylene carbonate (FEC) and chloroethylene carbonate (CIEC).

In addition to reducing additives, reaction additives were successfully. Reaction additives are not reduced throughout the loading cycle; instead, they are capable of scavenging intermediates of solvent reduction, or reacting with decomposition products of solvent molecules to form a stable SEI. Representatives of the group of reduction additives are, for example, $CO_2$ and aromatic esters. Phenyl acetate, 4-nitrophenyl acetate, 1-naphthyl acetate, 3-acetoxypyridine and methyl benzoate were used, for example, in combination with propylene carbonate. These compounds have an extended aromatic skeleton (conjugated πsystem) that can stabilize free radical anions, which occur as an intermediate of solvent reduction, by charge delocalization.

Some isocyanates were also used as additives with propylene carbonate:

4-bromobenzyl isocyanate (Br-BIC),
Benzyl isocyanate (BIC),
Phenyl isocyanate (PI)
2,4,6-Trimethoxyl phenylisocyanate (TMPI)
2,4,6-trifluorophenyl isocyanate (TFPI)
2-Bromoethyl isocyanate (BrEtNCO)
2,4,6-Trimethylbenzyl isocyanate (TMBI)
Diethoxyphosphinyl isocyanate (DOPI)
Ethyl isocyanate (EtNCO)
Lithium bis(oxalato)borate (LiBOB) and lithium difluoro (oxalato)borate (LiDFOB) can be used both as lithium salts and as additives.

Alkali metal acetates were also used as additives for propylene carbonate-based electrolytes. It is assumed that a larger ionic radius of alkali metal ions leads to the decrease of propylene carbonate reduction and thus to an improvement of battery performance.

Bis(2-methoxyethyl)ether (diglyme) served as another additive. Lithium-ions, which are solvated by diglyme, deposit preferentially into the graphite electrode, decompose within the graphite and form a protective layer.

Crown ethers as additives, such as [12]crown-4, were successful in suppressing propylene carbonate reduction. This could be attributed to the extremely strong solvation capability of Li ions they possess. The presence of crown ethers greatly weakens the Li-ion solvation of propylene carbonate molecules, so that propylene carbonate does not intercalate with Li ions in graphite. This leads to a reduction in propylene carbonate reduction.

However, all the additives listed above do not have a decisive influence on viscosity and ionic conductivity due to their small amount (≤5 wt % or vol %), so the high viscosity of propylene carbonate, as described above, continues to impede ion transport, which has a negative impact on the calendrical lifetime of a battery. Some additives are also harmful to the health of the human organism. These include, for example, 1,3-propane sultone (1,3-PS), which is classified as a substance of very high concern under REACH because the substance is carcinogenic and toxic.[6] Vinylene carbonate (VC), for example, is also toxic on contact with the skin.[7]

The available literature focused on SEI additives because the focus was on achieving compatibility with graphite. However, the cathode must be equally protected to avoid irreversible oxidation of the electrolyte solvents and consequent degradation of battery performance. Therefore, additives or co-solvents that form a protective layer on both the anode and the cathode are desirable. To date, this characteristic has only been observed for a few additives, such as lithium difluoro(oxalato)borate (LiDFOB) or vinylene carbonate (VC).

Some substances already used as additives were also used as co-solvents with propylene carbonate, such as ethylene sulfate (DTD). The substance has a very high melting point (95-97° C.), which means that in combination with propylene carbonate, higher viscosities, lower conductivities and, above all, lower battery performance at low temperatures can be expected compared with electrolytes based on propylene carbonate alone. The electrolyte studied consisting of 1 M $LiBF_4$ in 10 wt % DTD, 90 wt % propylene carbonate exhibits an ionic conductivity of only ~3.5 $mS \cdot cm^{-1}$ at 20° C., which is no longer within the desired conductivity range for electrolytes suitable for use.

The same effect can be expected for the co-solvent sulfolane, which also has a relatively high melting point ($T_m$=20-26° C.).

Furthermore, cyclic carbonates with long linear alkyl chains (number of carbon atoms ≥4)[8] were successfully used as co-solvents. A stable SEI is formed, but at 30° C. the conductivities of the electrolyte mixtures containing 1 M $LiPF_6$ are much lower (≤2.3 $mS \cdot cm^{-1}$) than those of electrolytes based only on propylene carbonate. This applies to hexylene carbonate, octylene carbonate and dodecylene carbonate.

Methyltetrafluoro-2-(methoxy)propionate as a co-solvent for propylene carbonate-based electrolytes also results in higher viscosities than electrolytes based on propylene carbonate alone.[9]

It has also been shown that the addition of 75 vol % of linear carbonates, such as DEC, DMC, and MEC, suppresses the decomposition of propylene carbonate on graphite.

Linear carbonates have also been used in other work in addition to other additives such as VC to reduce the viscosity of the propylene carbonate-based electrolyte. However, the use of volatile, highly flammable substances should be avoided, as previously mentioned, for safety reasons and in favor of cell longevity.

In addition to the use of additives and co-solvents, cyclization of propylene carbonate could be achieved by adding high concentrations of conducting salts (c(LiTFSI)≥2.2 mol/L).[11] However, it is known that increasing the concentration of conducting salts (c>1 mol/L) leads to higher viscosities and lower ionic conductivities. Moreover, the material costs increase, since lithium salts are usually expensive as solvents.

None of the above variants (SEI additives, co-solvents and high salt concentrations) could simultaneously compensate for both existing disadvantages of propylene carbonate. The formation of protective layers, preferably on the carbon-based anode, could be achieved by many substances, but the high viscosity of propylene carbonate still remains, which negatively affects the calendrical lifetime of a battery.

In an electrolyte mixture comprising propylene carbonate (PC) as solvent, tetrahydrothiophene-1-oxide as co-solvent and LiTFSI as conducting salt, it was recently found that the electrolyte adversely caused dissolution of aluminum current collectors despite good physicochemical properties, so further additives would be needed to address this problem.

SUMMARY

In some aspects, the invention provides a liquid electrolyte for use in lithium-ion, lithium-metal, and lithium-sulfur batteries, in which the liquid electrolyte comprises at least one organic nonlinear carbonate, at least one lithium salt, and at least one cyclic sulfoxide, and in which the liquid electrolyte does not comprise a combination of propylene carbonate, tetrahydrothiophene-1-oxide, and lithium bis(trifluoromethanesulfonyl)imide (LiTFSI).

In some aspects, the invention provides a lithium secondary battery comprising an anode, a cathode, a separator, and a liquid electrolyte for use in lithium-ion, lithium-metal, and lithium-sulfur batteries, in which the liquid electrolyte comprises: at least one organic nonlinear carbonate, at least one lithium salt, and at least one cyclic sulfoxide, and in which the liquid electrolyte does not comprise a combination of propylene carbonate, tetrahydrothiophene-1-oxide, and lithium bis(trifluoromethanesulfonyl)imide (LiTFSI).

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 4 b): Cyclic voltammograms of Li/graphite cells comprising 1 M $LiPF_6$ in tetrahydrothiophene-1-oxide; and FIG. 4 c): Cyclic voltammograms of Li/graphite cells comprising 1 M $LiPF_6$ in 15 mol % tetrahydrothiophene-1-oxide and 85 mol % propylene carbonate.

FIG. 5 b): Cyclic voltammograms of Li/NCM111 cells comprising 1 M $LiPF_6$ in tetrahydrothiophene-1-oxide; and FIG. 5 c): Cyclic voltammograms of Li/NCM111 cells comprising 1 M $LiPF_6$ in 15 mol % tetrahydrothiophene-1-oxide and 85 mol % propylene carbonate.

FIG. 9 b): Electrochemical impedance measurements to determine resistances of protective layers on the electrodes after 24 hours of open-circuit voltage, after 3 formation cycles, and after another 100 cycles, in NCMM11/NCM111 cells; and FIG. 9 c): Electrochemical impedance measurements to determine resistances of protective layers on the electrodes after 24 hours of open-circuit voltage, after 3 formation cycles, and after another 100 cycles, in graphite/NCM111 cells.

FIG. 10 b): X-ray photoelectron spectroscopy measurements to determine the composition and thickness of protective layers on the electrodes, for an NCM111 cathode.

DETAILED DESCRIPTION

Figure 1:
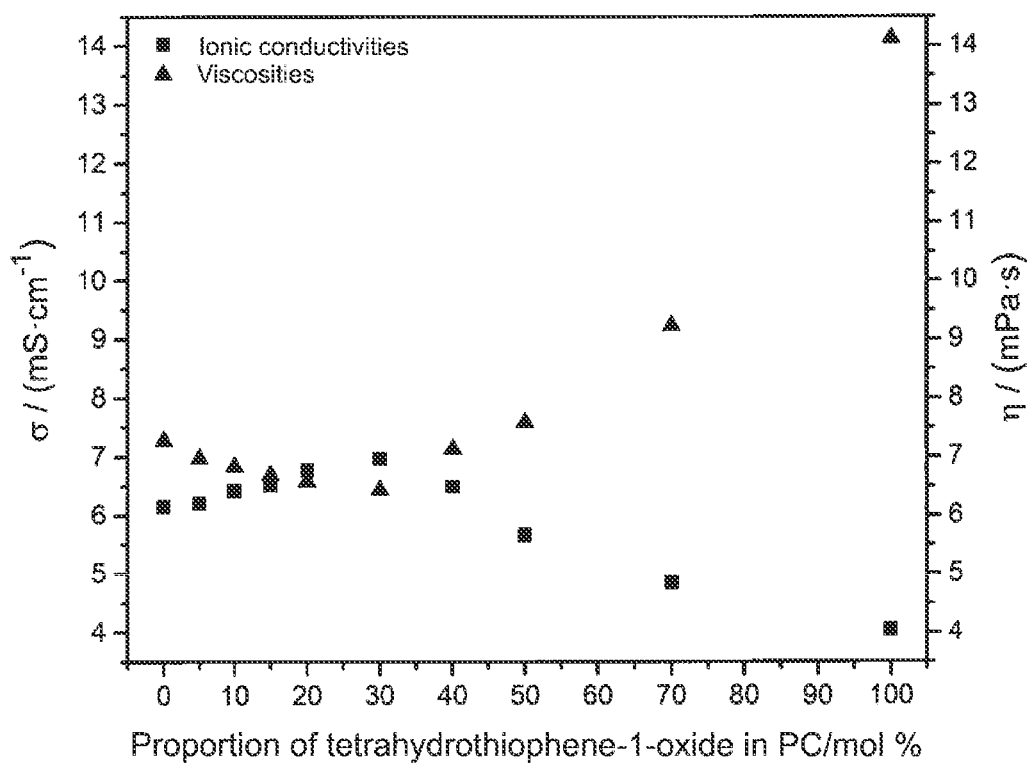
FIG. 1: Ionic conductivities (o) and viscosities (n) of an embodiment of the invention: Propylene carbonate/tetrahydrothiophene-1-oxide electrolytes with $LiPF_6$ as the conducting salt at different solvent contents.

The invention relates to novel liquid electrolytes for applications in rechargeable lithium ion batteries, lithium metal batteries and lithium-sulfur batteries. Electrolyte mixtures comprising organic nonlinear carbonates as solvent and cyclic sulfoxides as cosolvent in combination with at least one lithium salt show elevated conductivities and reduced viscosities compared to electrolytes based exclusively on propylene carbonate. Moreover, they are soluble within a wide temperature window and show good conductivities and excellent stabilities even at low temperatures. The solvents permit high solubility and dissociation of various lithium salts, are inexpensive to produce and simultaneously safe to the human organism. When the electrolytes of the invention are used in batteries having a carbon-based electrode as anode and a transition metal electrode as cathode, effective, electrically insulating protective layers having good Lit ion conductivity are formed on both electrodes, and these enable stable cycling with high and reversible discharge capacities.

One aspect of the invention is to provide a new liquid electrolyte for applications in lithium-ion, lithium-metal, and lithium-sulfur batteries that is liquid and well-conductive over a wide temperature window (at least ΔT=−150-120° C.) and has improved ion transport as well as good cycling properties, i.e., high reversible capacities (>90 mA h $g^{-1}$) and long lifetime (>2000 cycles), especially using carbon-based electrodes. The use of highly volatile and flammable substances, especially linear carbonates, should be avoided to ensure adequate safety. The solvents should have high relative permittivities to allow high solubility and dissociation of the lithium salt and be able to form stable protective layers on the electrodes, especially an anode protective layer (SEI) and a cathode protective layer (CEI), both of which are well Lit ion permeable and insulating to avoid irreversible oxidation and reduction of the solvent.

Aspects of the invention include a propylene carbonate-based liquid electrolyte having the features in accordance with the main claim. Advantageous embodiments of the liquid electrolyte can be found in the claims referring back to it.

In the context of the invention, it was found that liquid mixtures comprising at least one nonlinear organic carbonate as the main solvent and at least one cyclic sulfoxide in combination with at least one conducting salt are depicted as suitable liquid electrolytes for lithium-ion batteries. Here, the cyclic sulfoxide serves as a co-solvent with a proportion of 10-40 mol-% based on the solvent of the electrolyte.

The organic non-linear carbonate is in particular non-linear, ring-shaped carbonates such as ethylene carbonate (EC), propylene carbonate (PC), 1,2-butylene carbonate, 2,3-butylene carbonate, 1,2-pentylene carbonate, 2,3-pentylene carbonate, 1,2-hexylene carbonate, 1,2-octylene carbonate, 1,2-dodecylene carbonate, and mixtures of at least two of the above compounds.

The liquid electrolyte according to the invention, in particular for lithium-ion batteries, explicitly avoids the use of linear carbonates, since their high volatility and flammability in principle lead to a safety risk.

The cyclic sulfoxide is a heterocyclic compound having a sulfinyl group (—S=O). The cyclic sulfoxide can have variable ring sizes of n=3 to 10 ring carbon atoms. Besides sulfur, the cyclic sulfoxide does not comprise a further heteroatom in the ring. The ring may have one or more double bonds as a function of the number x of the ring carbon atoms.

A typical and particularly advantageous representative of a cyclic sulfoxide is tetrahydrothiophene-1-oxide. This is a five-membered cyclic sulfur substance that shows structural similarity to additives and co-solvents (ES, 1,3-PS, sulfolane) previously used in lithium-ion batteries. Tetrahydrothiophene-1-oxide has not been considered to date as an electrolyte component of lithium-ion, lithium-metal and lithium-sulfur batteries.

Tetrahydrothiophene-1-oxide is simple to produce (reaction of tetrahydrothiophene with hydrogen peroxide and a catalyst at room temperature) and can thus in principle be cheaply synthesized. Tetrahydrothiophene is already used worldwide as an odorant in natural gas. The solvent mixture according to the invention is only a two-component system, with at least one non-linear organic carbonate as solvent and a cyclic sulfur substance, such as tetrahydrothiophene-1-oxide, as co-solvent, which regularly keeps the price low.

A particularly advantageous electrolyte mixture has been found to be the combination of propylene carbonate (PC) as solvent with tetrahydrothiophene-1-oxide as co-solvent. Although the electrolyte mixture according to the invention is described in more detail below by way of the example of propylene carbonate/tetrahydrothiophene-1-oxide, it should be explicitly mentioned at this point that, according to the invention, it is also intended to comprise all other combinations, especially mixtures of organic, non-linear carbonates with one or more cyclic sulfoxides.

Only the special combination of an electrolyte mixture comprising propylene carbonate (PC) as solvent, tetrahydrothiophene-1-oxide as co-solvent and lithium bis(trifluoromethanesulfonyl)imide (LiTFSI) as conducting salt is to be excluded from this according to the invention, since it is already disclosed in the prior art[17], and also adversely promotes the dissolution of aluminum from the cathode.

Propylene carbonate/tetrahydrothiophene-1-oxide liquid electrolyte as a preferred embodiment of the invention—as well as all other electrolyte mixtures according to the invention-represents a safe electrolyte for use in lithium-ion batteries.

Both solvents of the embodiment, as well as other non-linear organic carbonates, exhibit comparable high flash points ($T_F$) and boiling points ($T_b$):

| | | |
|---|---|---|
| Propylene carbonate: | $T_F$ = 116° C.[2] | $T_b$ = 242° C.[3] |
| Ethylene carbonate: | $T_F$ = 143° C.[12] | $T_b$ = 243-244° C.[12] |
| 1,2-Butylene carbonate: | $T_F$ = 121° C.[13] | $T_b$ = 240° C.[13] |
| Tetrahydrothiophene-1-oxide: | $T_F$ = 112° C.[14] | $T_b$ = 235-237° C.[14] |

By way of example, this makes it advantageous for use in stationary energy storage systems, which can also be used in private households.

The propylene carbonate/tetrahydrothiophene-1-oxide electrolyte according to the invention—as well as all other electrolyte mixtures according to the invention-regularly poses no danger to the human organism.

The two solvents of the preferred embodiment as well as other non-linear organic carbonates are classified as non-hazardous:

| | |
|---|---|
| Propylene carbonate: | LD50, rat, oral: >5,000 mg/kg |
| | LD50, rabbit, dermal: >2,000 mg/kg[2] |
| Ethylene carbonate: | LD50, rat, dermal: >2,000 mg/kg |
| | LC50, rat, inhalative, 7 h: >1.268 mg/L[12] |
| 1,2-Butylene carbonate: | LD50, rat, oral: >5,000 mg/kg |
| | LD50, rabbit, dermal: >2,000 mg/kg[13] |
| Tetrahydrothiophene-1-oxide: | LD50, mouse, intraperitoneal: 3,500 |

Lithium-ion batteries with liquid electrolytes according to the invention can thus be handled without problems in private households without danger to humans emanating from the electrolyte in the case of a damaged battery.

By adding, for example, 30 mol % of tetrahydrothiophene-1-oxide to propylene carbonate, a clear maximum in ionic conductivity (~7.0 mS cm$^{-1}$ at 25° C.) was obtained in the presence of LiPF$_6$.

Here, the conductivities are a direct consequence of the viscosities, which also show a minimum (~6.4 mPa's at 25° C.) in the system containing 30 mol % tetrahydrothiophene-1-oxide and LiPF$_6$.

With LiBF$_4$ as the lithium salt, the maximum (~6.5 mS·cm$^{-1}$ at 25° C.) occurs with the addition of 50 mol % tetrahydrothiophene-1-oxide to propylene carbonate.

This effect is observed even though tetrahydrothiophene-1-oxide has a higher viscosity than propylene carbonate, and can be explained using Raman data and self-diffusion coefficients of the individual species from PFG NMR data. Due to the high Lit ion affinity of the sulfinyl group (—S=O), propylene carbonate is replaced in the complex even with small additions of tetrahydrothiophene-1-oxide. Molecular dynamics simulations support this statement.

Table 1 below shows the concentrations of propylene carbonate (PC) and tetrahydrothiophene-1-oxide (abbreviated here as THT1oxide) in the 1 M LiPF$_6$-based electrolytes and coordination numbers of Li—PC as well as Li-tetrahydrothiophene-1-oxide complexes from molecular dynamics simulations. The possible solvate complexes resulting therefrom are also listed.

TABLE 1

| Proportion of tetrahydrothiophene-1-oxide [mol %] | c(PC) [mol L$^{-1}$] | c(THT1oxid) [mol L$^{-1}$] | N(PC) | N(THT1oxide) | Potentially complex |
|---|---|---|---|---|---|
| 0 | 10.6 | 0.0 | 5.4 | 0.0 | Li(PC)$_5$ |
| 10 | 9.5 | 1.1 | 3.5 | 0.9 | Li(PC)$_4$(THT1oxide)$_1$ |
| 20 | 8.4 | 2.1 | 2.7 | 1.8 | Li(PC)$_3$(THT1oxide)$_2$ |
| 30 | 7.3 | 3.1 | 2.0 | 2.7 | Li(PC)$_2$(THT1oxide)$_3$ |
| 40 | 6.2 | 4.2 | 1.3 | 3.1 | Li(PC)$_1$(THT1oxide)$_3$ |
| 50 | 5.2 | 5.2 | 0.7 | 3.5 | Li(PC)$_1$(THT1oxide)$_3$ |
| 60 | 4.1 | 6.2 | 0.2 | 3.8 | Li(THT1oxide)$_4$ |
| 70 | 3.1 | 7.2 | 0.1 | 3.9 | Li(THT1oxide)$_4$ |
| 100 | 0.0 | 10.1 | 0.0 | 4.0 | Li(THT1oxide)$_4$ |

The molecular dynamics simulations confirm that tetrahydrothiophene-1-oxide replaces PC in the complex as soon as there is enough tetrahydrothiophene-1-oxide in solution, i.e., at least 1 mol of tetrahydrothiophene-1-oxide for 1 mol of Li$^+$. The high Li$^+$ affinity of the sulfinyl (—S═O) group causes tetrahydrothiophene-1-oxide to displace the other PC molecules when the concentration of tetrahydrothiophene-1-oxide increases up to 30 mol %. Above 30 mol %, tetrahydrothiophene-1-oxide dominates the complex, and above 40 mol %, PC leaves the solvation complex to consist of only four solvent molecules.

When more than 30 mol % of tetrahydrothiophene-1-oxide is added to the LiPF$_6$-based electrolyte, the substance is present in excess. Since the sulfur substance moves slowly through the electrolyte, i.e., at a speed of about $7\text{-}10\cdot10^{-11}$ m$^2\cdot$s$^{-1}$, it hinders the transport of the other species present. The ionic conductivity therefore regularly decreases again at concentrations >30 mol-%.

Thus, propylene carbonate intercalates into the carbon-based electrode predominantly without Li$^+$ ions when tetrahydrothiophene-1-oxide is added, which reduces the reduction of propylene carbonate. A similar effect has already been observed in the prior art crown ethers.

Overall, improved ion transport was recorded for the liquid electrolytes of the invention containing 10-40 mol-% tetrahydrothiophene-1-oxide. Due to lower polarization effects, reversible capacities and a long calendar life of a battery can thus be made possible.

This effect was also found for other liquid electrolytes according to the invention, so that a preferred concentration for the cyclic sulfoxide as co-solvent is suggested in the range between 10 and 40 mol %, preferably between 15 and 35 mol % based on the solvent of the electrolyte.

The propylene carbonate/tetrahydrothiophene-1-oxide electrolyte embodiment according to the invention further exhibits remarkable physicochemical behavior at low temperatures. The conductivity and viscosity difference is much larger for low temperatures. Electrolytes comprising 30 mol % tetrahydrothiophene-1-oxide show conductivities at −20° C. that are about 1.5 times higher than electrolytes based on propylene carbonate alone. In addition, the compounds do not crystallize at temperatures as low as −150° C.

This is of particular importance for applications, as crystalline electrolytes would no longer provide the necessary ion transport and the battery would therefore no longer function.

These properties, of the liquid electrolyte still being liquid even at low temperatures and exhibiting increased ionic conductivity, could also be confirmed for most of the liquid electrolytes claimed according to the invention.

The behavior at low temperatures therefore makes the electrolyte according to the invention interesting for use in cold regions, such as polar regions or in space travel as an energy storage device. Electrolyte decomposition at high temperatures is limited only by the lithium salt.

The exemplary embodiment according to the invention comprising propylene carbonate/tetrahydrothiophene-1-oxide mixtures in combination with a conducting salt also enables regular stable cycling in lithium-ion batteries with carbon-based anodes and transition metal oxide-based cathodes, although propylene carbonate and tetrahydrothiophene-1-oxide as sole solvents are incompatible with the electrodes, i.e., both solvents decompose at ~0.8 V vs. Li/Li$^+$, leading to exfoliation of graphite in the case of propylene carbonate, while the tetrahydrothiophene-1-oxide molecules and/or their decomposition products suppress the de/intercalation of lithium. Effective protective layers were shown to form on the electrodes, an anode protective layer (SEI) on the carbon-based electrode and a cathode protective layer (CEI) on the transition metal electrode. The anode protection layer typically has a thickness (~5 nm) high enough to be visible under a scanning electron microscope. In comparison, electrolytes based on ethylene carbonate (EC) and vinylene carbonate (VC) regularly lead to layers of no more than 3.3 nm.[15]

The analysis with the scanning electron microscope was complicated in that the sample was hardly electrically conductive and thus a high secondary electron current could not be obtained. The protective layer on the carbon-based electrode thus exhibits a low electrical conductivity, which advantageously protects against further electrolyte reduction and thus increases the service life of the battery.

The anode protective layer is formed almost completely in the first three forming cycles and initially covers the entire electrode in terms of area, while it nestles around the individual secondary particles of the active material as it progresses. Secondary particles consisting of primary particles on the order of 1 μm and typically have sizes of less than 1 to 100 μm.[16]

The cathodic protection layer is regularly much thinner (~1 nm), but is also formed almost completely after formation. The organic content of both films, consisting of a polymer with ether groups, is approximately 66 at %, which is excellent with respect to the permeability of the solvated Li$^+$ cations, since inorganic films are less permeable.

Based on XPS data, the sulfur compounds are not part of the anode protective layer, but form only a portion of the inorganic portion of the cathode protective layer in which metal sulfites and sulfates are detectable. These salts have a positive influence on the battery. They are known electronic insulators and can effectively prevent the continued oxidation of solvent molecules.

Cyclic voltammetry measurements could show that the preferred tetrahydrothiophene-1-oxide as co-solvent is not reduced at higher potentials than propylene carbonate (>0.8 V vs. Li/Li+). Tetrahydrothiophene-1-oxide is believed to initiate a polymerization reaction involving products or intermediates (radicals) of the decomposition of propylene carbonate. Stable galvanostatic cycling is thus possible for all propylene carbonate/tetrahydrothiophene-1-oxide electrolytes with contents of 10-40 mol % tetrahydrothiophene-1-oxide as particular embodiments of the invention.

This corresponds to the range for which an increase in conductivities could be recorded. The formation of stable protective layers on both electrodes and the reduced propylene carbonate decomposition due to propylene carbonate intercalation without Li ions into the carbon-based electrode, as described above, lead to high reversible specific discharge capacities (95-110 mA hg$^{-1}$). The highest specific discharge capacities can be achieved with 15 mol % tetrahydrothiophene-1-oxide in LiPF$_6$-based electrolytes. After 100 cycles, the discharge capacities are still within the measurement error range of 100% of the output capacity. At least 55% of the output capacity is still present after 2000 cycles.

According to the initial investigations, a mixture of 15 mol % tetrahydrothiophene-1-oxide and 85 mol % propylene carbonate comprising at least 0.01 mol/L of at least one lithium salt is proposed as particularly advantageous for the exemplary system propylene carbonate/tetrahydrothiophene-1-oxide electrolyte. The electrolyte exhibits the best cyclization properties with carbon-based and transition metal electrodes and improved ion transport. It is liquid over a wide temperature window ($\Delta T=-150$ bis $120°$ C.) and exhibits significantly higher ionic conductivities than electrolytes based on propylene carbonate alone, even at low temperatures.

The following lithium salts in particular are suitable as conducting salts for use in the liquid electrolyte according to the invention, either individually or as any desired mixtures:

Lithium hexafluorophosphate (LiPF$_6$),
Lithium tetrafluoroborate (LiBF$_4$),
Lithium perchlorate (LiClO$_4$),
Lithium hexafluoroarsenate(V) (LiAsF$_6$),
Lithium trifluoromethanesulfonate (LiCF$_3$SO$_3$),
Lithium tris(trifluormethylsulfonyl)methanide (LiTFSM)
Lithium bis(oxalato)borate (LiBOB),
Lithium oxalyldifluoroborate (LiBF$_2$C$_2$O$_4$),
Lithium nitrate (LiNO$_3$),
Lithium fluoroalkyl phosphate (LiPF$_3$(CF$_2$CF$_3$)$_3$),
Lithium bisperfluorethysulfonylimide (LiBETI).

The use of salts such as lithium bis(trifluoromethanesulfonyl)imide (LiTFSI) and lithium bis(fluorosulfonyl)imide (LiFSI) is disadvantageously not possible without additional additives because they are known to promote dissolution of aluminum, which makes up the current collector of the cathode, at high potentials (>3 V vs. Li/Li+).

Tetrahydrothiophene-1-oxide as a preferred cyclic sulfoxide exhibits a high relative permittivity of 44.1 at 20° C. Propylene carbonate shows a very high relative permittivity of 66.2 at 20° C. This enables high solubility and dissociation of the lithium salt, especially in the preferred embodiment of the invention (propylene carbonate/tetrahydrothiophene-1-oxide solvent).

Here, salt concentrations of 0.01-22 mol/L based on the liquid electrolyte are generally suggested as suitable, preferably salt concentrations in the range of 0.1 to 10 mol/l, not only for the preferred embodiment example but for all claimed liquid electrolytes.

Although tetrahydrothiophene-1-oxide stands as a preferred example of cyclic sulfoxides, it was found in the context of the invention that other compounds, individually or also as mixtures, are also suitable for being able to further improve the properties already present. The modifications of the cyclic sulfoxide encompassed by the invention can be depicted on the basis of the general formula (1) as follows.

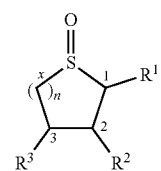

(1)

The cyclic sulfoxide has at least 3 or more ring carbon atoms x. The maximum number of ring carbon atoms x is fixed at 10, i.e. n=0, 1, 2, 3, 4, 5, 6 or 7.

The radicals R$^1$, R$^2$, R$^3$ up to a maximum of R$^{10}$ which are arranged on the ring carbon atoms x are each identical or independently of one another selected from the group consisting of:

linear or branched alkyl groups with 1 to 12 carbon atoms,
linear or branched cycloalkyl groups with 1 to 12 carbon atoms,
aryl groups with 5 to 6 carbon atoms,
aryloxy groups with 5 to 6 carbon atoms,
alkoxy groups with 1 to 12 carbon atoms,
especially (poly)alkoxy groups with up to 5 ethoxy units
hydrogen.

If a ring carbon atom does not form a double bond, it is saturated with a hydrogen atom in addition to the R radical.

In particular, the cyclic sulfoxides listed below have proven to be particularly suitable as co-solvents in the electrolyte mixture according to the invention, since they are regularly present in liquid form between -20 and 80° C., have comparatively good conductivity, and also exhibit improved ion transport and good cyclization properties:

Tetrahydrothiophene-1-oxide;
Thietane-1-oxide;
Tetrahydro-2H-thiopyran-1-oxide;
Thiepane-1-oxide;
2-Methyltetrahydrothiophene-1-oxide;
3-Methyltetrahydrothiophene-1-oxide;
2-Isopropyltetrahydrothiophene-1-oxide;
3-Isopropyltetrahydrothiophene-1oxide.

Figure 14:
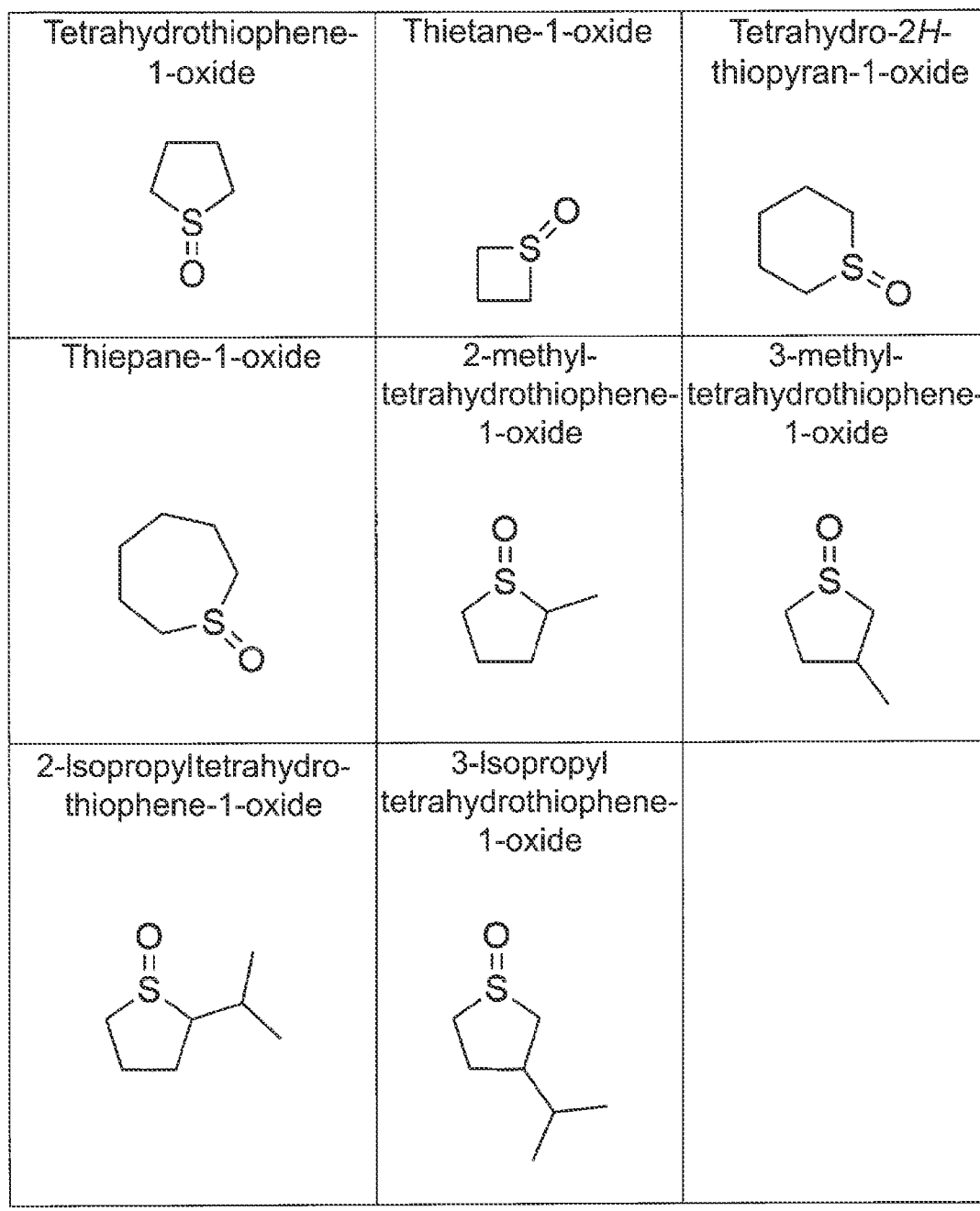
FIG. 14: Structural formulas of selected cyclic sulfoxides as co-solvents.

The structures of the aforementioned compounds are shown in FIG. 14.

In addition, it has been found that the liquid electrolytes according to the invention exhibit very good resistance to carbon-based electrodes in addition to good physicochemical properties. This was found out in cyclic voltammetry experiments as well as in galvanostatic cycling of the liquid electrolytes in combination with a carbon-based anode as well as a transition metal-based cathode. The protective layers (SEI and CEI) formed on the respective electrodes proved to be well permeable to Li+ ions, but at the same time caused sufficient electronic isolation.

In summary, it can be stated that liquid electrolytes optimized according to the invention are shown for use in lithium-ion batteries, which combine the advantages of previous SEI additives and viscosity-lowering co-solvents and completely dispense with volatile, highly flammable substances. Advantageously, no further additives are necessary and are also not provided. The increased safety makes the liquid electrolytes according to the invention particularly interesting for applications on a larger scale and for private households.

The following positive properties could be recorded with the liquid electrolytes according to the invention:

They are inexpensive to produce;
They have a high level of safety due to the use of solvents with high flash and boiling points;
They are harmless to the human organism;
They have increased conductivities and reduced viscosities compared to electrolytes based on propylene carbonate;
They have a wide temperature window in which the electrolytes are present in liquid form;
They exhibit good conductivities and excellent stabilities even at low temperatures;
They advantageously form effective, well Li+ ion permeable and electronically insulating protective layers on both carbon-based and transition metal electrodes;
They exhibit good cyclization properties with high and reversible capacities;
They allow the use of many different lithium salts as conducting salt;
They have a high solubility and good dissociation of the lithium salts.

EXAMPLES

In addition, aspects of the invention are explained in more detail by means of embodiments, figures and a table, especially on the preferred embodiment propylene carbonate/tetrahydrothiophene-1-oxide with LiPF$_6$ as conducting salt, without this leading to a limitation of the broader scope of protection.

Tetrahydrothiophene-1-oxide was dried over molecular sieve (water content <80 ppm) before use. Electrolytes containing 1 M LiPF$_6$ or 1 M LiBF$_4$, x mol % tetrahydrothiophene-1-oxide, and (100-x) mol % propylene carbonate (x=0, 5, 10, 15, 20, 30, 40, 50, 70, 100) were prepared in the absence of air and water.

In order to verify the improved viscosity of these aforementioned electrolytes, viscosity measurements were performed using an Anton Paar MCR 301 rheometer. The device was equipped with a CTD 450 temperature system and a CP50-0.5/TG measurement system. The viscosities were measured in the temperature range from –20° C. to 50° C. in 10° C. steps and at 25° C. The shear rates were increased with increasing temperature from 2000 s$^{-1}$ to 9000 s$^{-1}$. The results of this study are shown in FIG. 1.

The ionic conductivities of these aforementioned electrolytes were measured with an MCS 10 impedance based conductivity meter (BioLogic). The instrument was calibrated with a KCl standard solution at 25° C. before each measurement. Finally, the measurement was carried out in the temperature ranging in steps of 5° C. from –20° C. to 50° C. The results of this study are also shown in FIG. 1.

Using 1 M LiPF$_6$ as a conducting salt, maximum conductivities of 7.0 mS cm-1 and minimum viscosities of 6.4 mPa's at 25° C. were obtained with 30 mol % tetrahydrothiophene-1-oxide. Comparatively, propylene carbonate with 1 M LiPF$_6$ without co-solvent shows conductivities of 6.2 mS cm$^{-1}$ and viscosities of 7.3 mPa·s. Conductivity readings for selected temperatures and tetrahydrothiophene-1-oxide contents are shown in Table 2 below.

TABLE 2

Ionic conductivities of propylene carbonate/tetrahydrothiophene-1-oxide mixtures with 1M LiPF$_6$ as the conducting salt at –20° C., 0° C., 25° C., and 50° C.

| Proportion of tetrahydrothiophene-1-oxide/mol % | Ionic conductivity/mS cm$^{-1}$ | | | |
| --- | --- | --- | --- | --- |
| | –20° C. | 0° C. | 25° C. | 50° C. |
| 0 | 1.0 | 2.7 | 6.2 | 10.6 |
| 15 | 1.2 | 3.0 | 6.5 | 11.0 |
| 30 | 1.5 | 3.4 | 7.0 | 11.5 |
| 50 | 1.2 | 2.7 | 5.7 | 9.5 |
| 100 | 0.9 | 1.9 | 4.0 | 7.0 |

Figure 12:
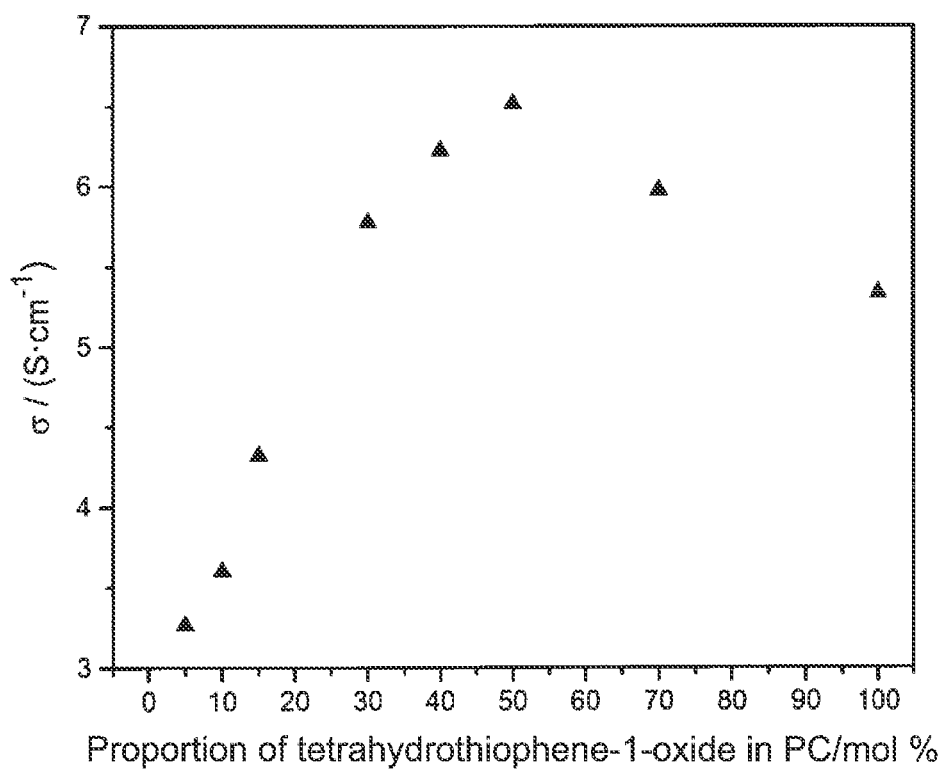
FIG. 12: Ionic conductivities (c) of propylene carbonate/tetrahydrothiophene-1-oxide electrolytes with $LiBF_4$ as the conducting salt at different solvent contents.

The ionic conductivities of tetrahydrothiophene-1-oxide/propylene carbonate electrolytes with 1 M LiBF$_4$ as the conducting salt at 25° C. are shown in FIG. 12. A maximum ionic conductivity of 6.5 mS cm$^{-1}$ was obtained with 50 mol % tetrahydrothiophene-1-oxide. At –20° C., the maximum ionic conductivity is still 1.6 mS cm$^{-1}$.

Maximum conductivities at temperatures of 25° C. in the range of 6.0 to 7.0 mS cm$^{-1}$ could be determined for each of the liquid electrolyte systems under further investigation. At temperatures of –20° C., the overall ionic conductivities were in the range of 0.9-1.6 mS cm$^{-1}$.

The minimum viscosities for the liquid electrolyte systems under further investigation were in the range of 6.4 to 7.8 mPa·s at 25° C. At –20° C., viscosities in the range of 28.1-45.0 mPa were determined.

Figure 2:
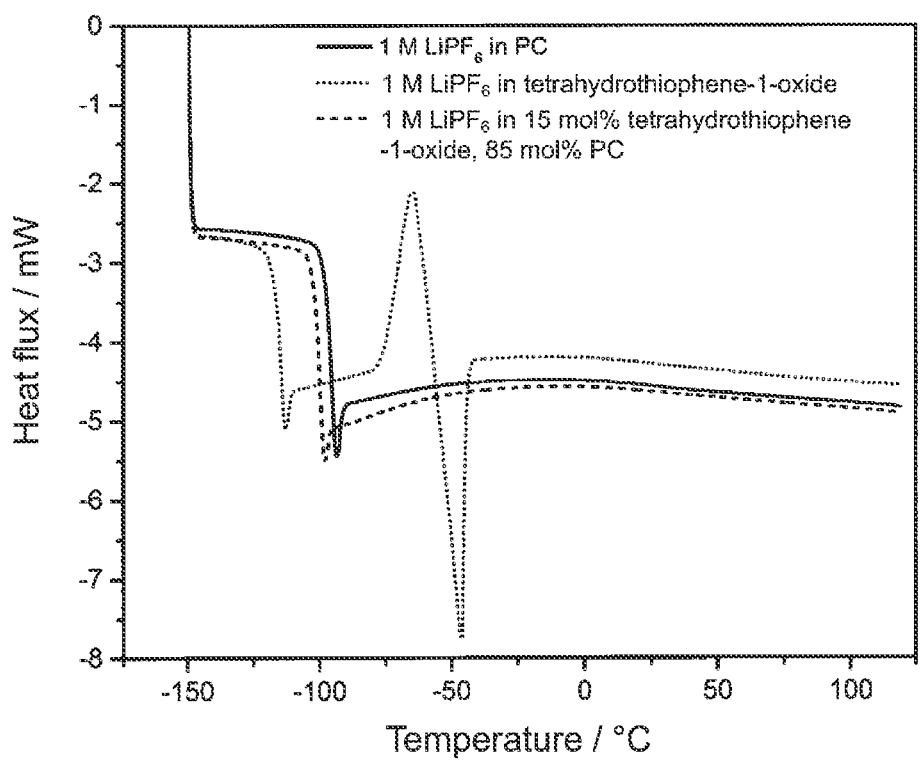
FIG. 2: Heat flux of electrolytes comprising 1 M $LiPF_6$ in propylene carbonate, 1 M $LiPF_6$ in tetrahydrothiophene-1-oxide, and 1 M $LiPF_6$ in 15 mol % tetrahydrothiophene-1-oxide and 85 mol % propylene carbonate between −150° C. and 120° C.

Dynamic differential calorimetry (DSC) measurements were performed with a DSC Q2000 meter. The samples were weighed in hermetic aluminum crucibles. After equilibration at 25° C. and an isothermal step for 2 minutes, the heat flux was measured three times from –150° C. to 120° C. Helium was used as ambient gas at 25 ml/min. It was shown that the electrolyte according to the invention does not crystallize in the predetermined temperature range and thus has excellent stability at low temperatures. The results for the preferred embodiment are shown in FIG. 2.

Figure 3:
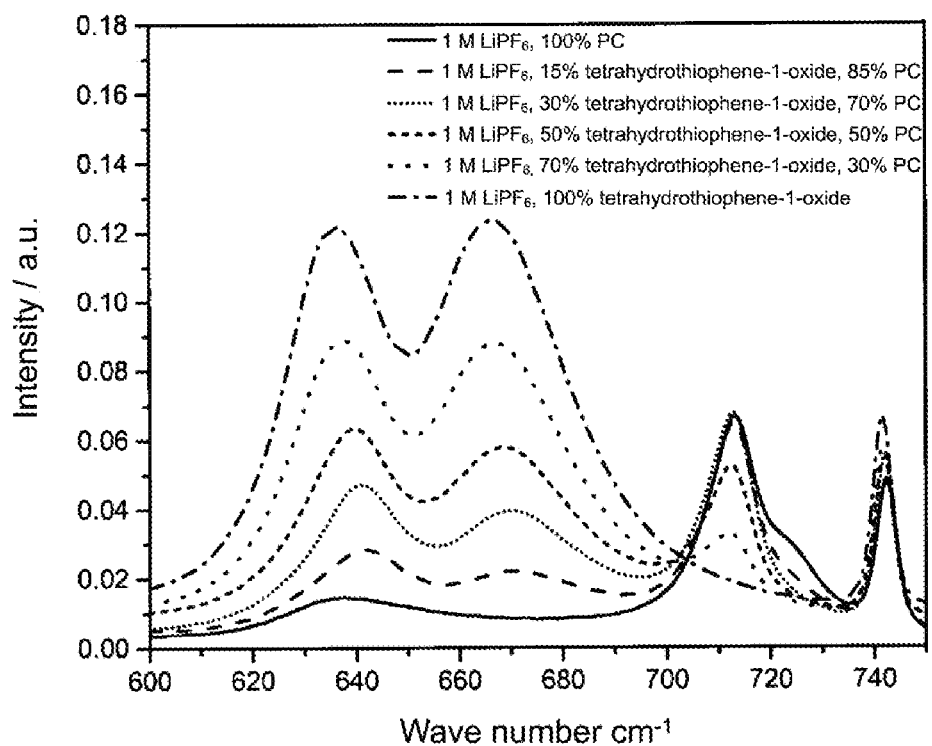
FIG. 3: Raman spectra of the propylene carbonate/tetrahydrothiophene-1-oxide electrolytes according to the invention with $LiPF_6$ as the conducting salt at different solvent contents.

To understand the effect on viscosities and ionic conductivities, Raman measurements were performed with a Bruker Vertex 70 spectrometer. This was equipped with a RAM II Raman module, a Nd:YAG laser with a wavelength of 1064 nm and an output power of 300 mW. Bruker OPUS software was used to acquire 1000 scans with a resolution of 2 cm$^{-1}$ from the spectral range 0-4000 cm$^{-1}$. A high Li$^+$ ion affinity of the sulfinyl group (—S═O) could be found. Propylene carbonate is replaced by tetrahydrothiophene-1-oxide in the Li-solvent complex, even with low additions. The spectra of the aforementioned electrolytes can be found in FIG. 3.

Figure 6:
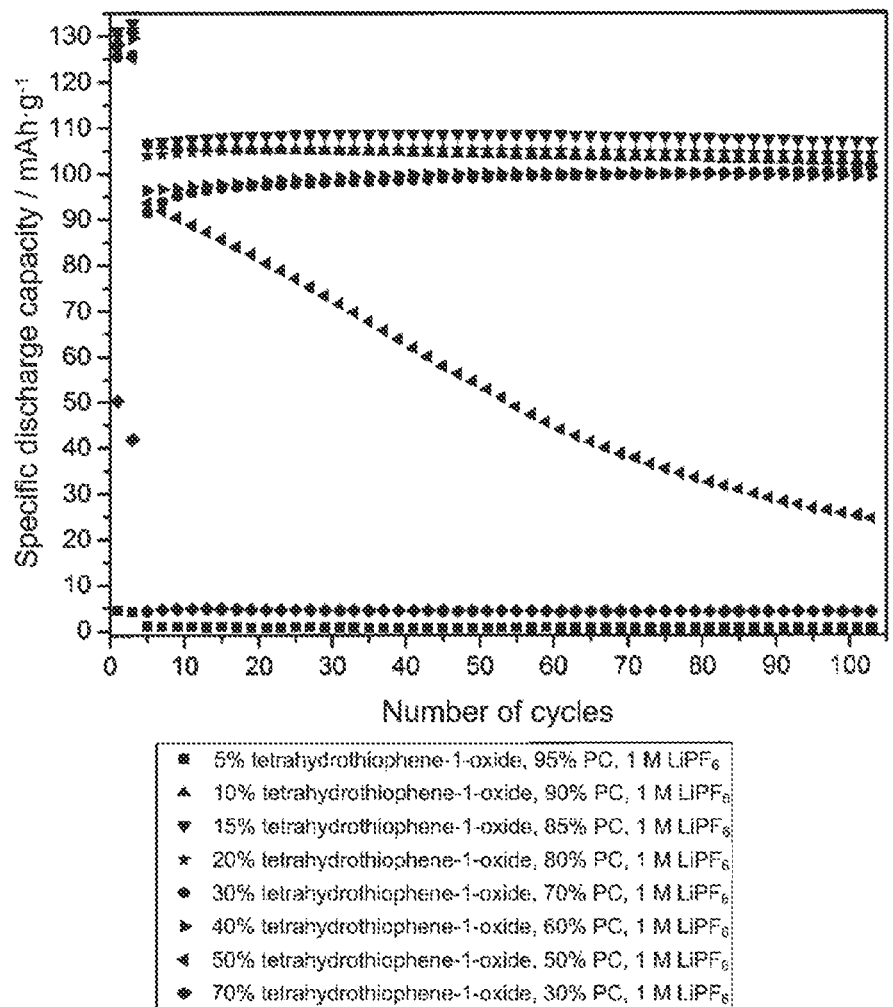
FIG. 6: Galvanostatic cycling of propylene carbonate/tetrahydrothiophene-1-oxide electrolytes according to the invention with $LiPF_6$ as the conducting salt at different solvent contents in graphite/NCM111 cells.
Figure 13:
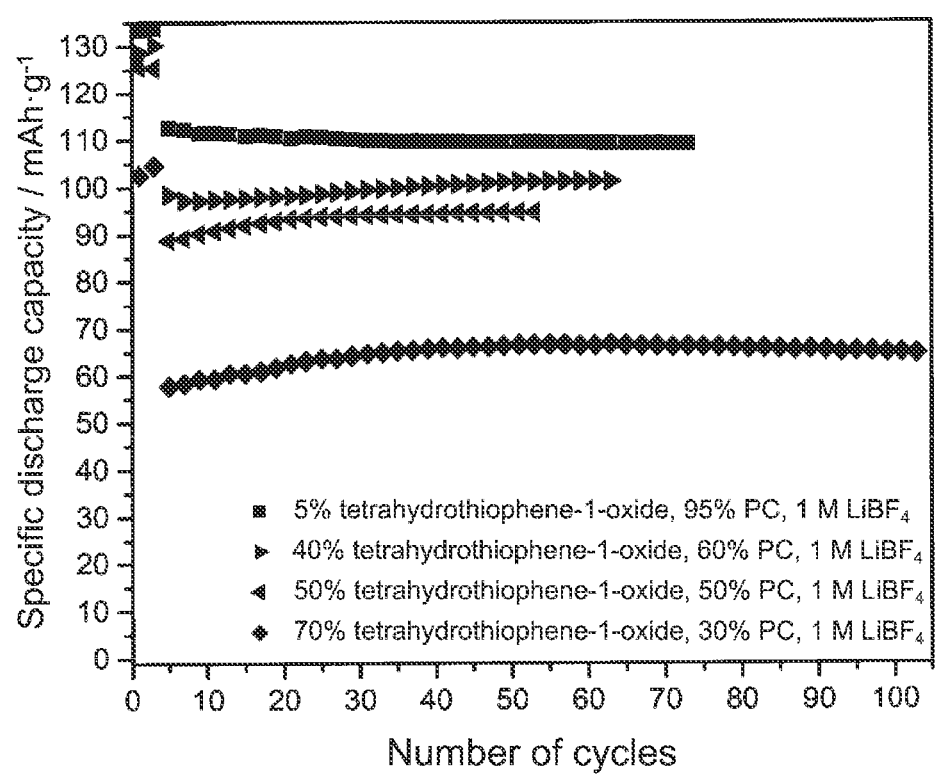
FIG. 13: Galvanostatic cycling of propylene carbonate/tetrahydrothiophene-1-oxide electrolytes according to the invention with $LiBF_4$ as the conducting salt at different solvent contents in graphite/NCM111 cells.

Furthermore, cells with graphite and LiNi$_{1/3}$Co$_{1/3}$Mn$_{1/3}$O$_2$ (NCM111) were galvanostatically cycled with the tetrahydrothiophene-1-oxide/propylene carbonate electrolytes according to the invention in the potential range 3-4.2 V at 20° C. To this end, button cells were constructed in a dry room (water content <30 ppm) containing Separion® as a separator and 100 µl of electrolyte. After 3 formation cycles at 0.2 C, the cells were cycled for 100 cycles at 1 C. For 1 M LiPF$_6$ (FIG. 6) and for 1 M LiBF$_4$ (FIG. 13), the specific discharge capacities are shown as a function of the number of cycles.

The use of electrolytes containing 1 M LiPF$_6$ or 1 M LiBF$_4$, PC and 10-40 mol % tetrahydrothiophene-1-oxide allows stable cycling without fading at discharge capacities of 95-110 mA h/g. A content of 15 mol % tetrahydrothiophene-1-oxide leads to the highest discharge capacities of ~110 mA h/g. After 100 cycles, there is still ~100% of the output capacity.

Figure 4:
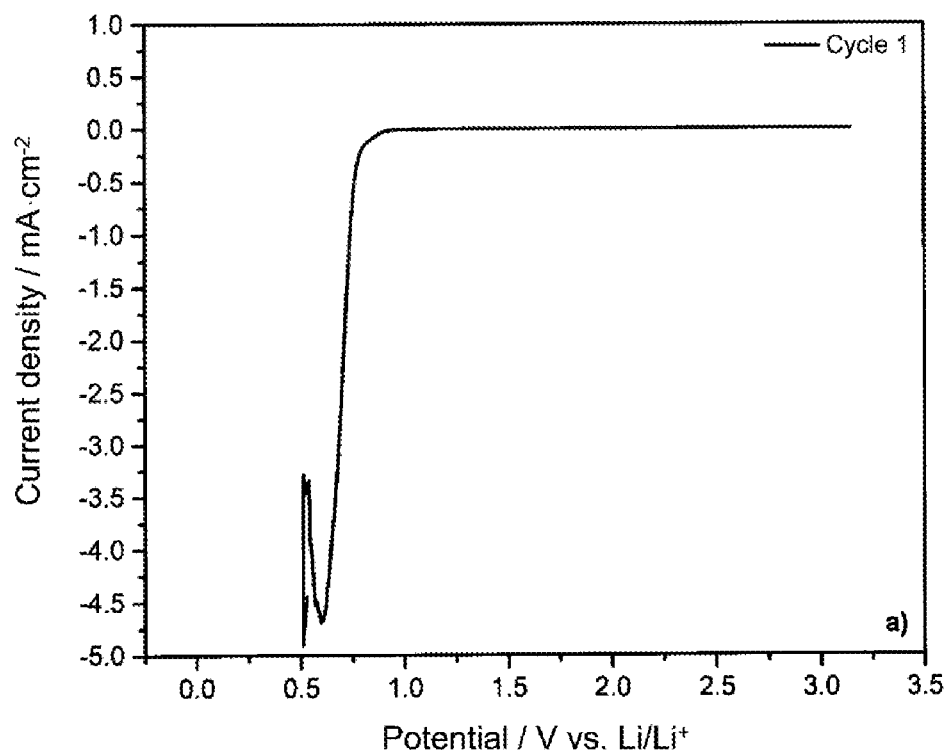
FIG. 4 a): Cyclic voltammograms of Li/graphite cells comprising 1 M $LiPF_6$ in propylene carbonate.
Figure 4:
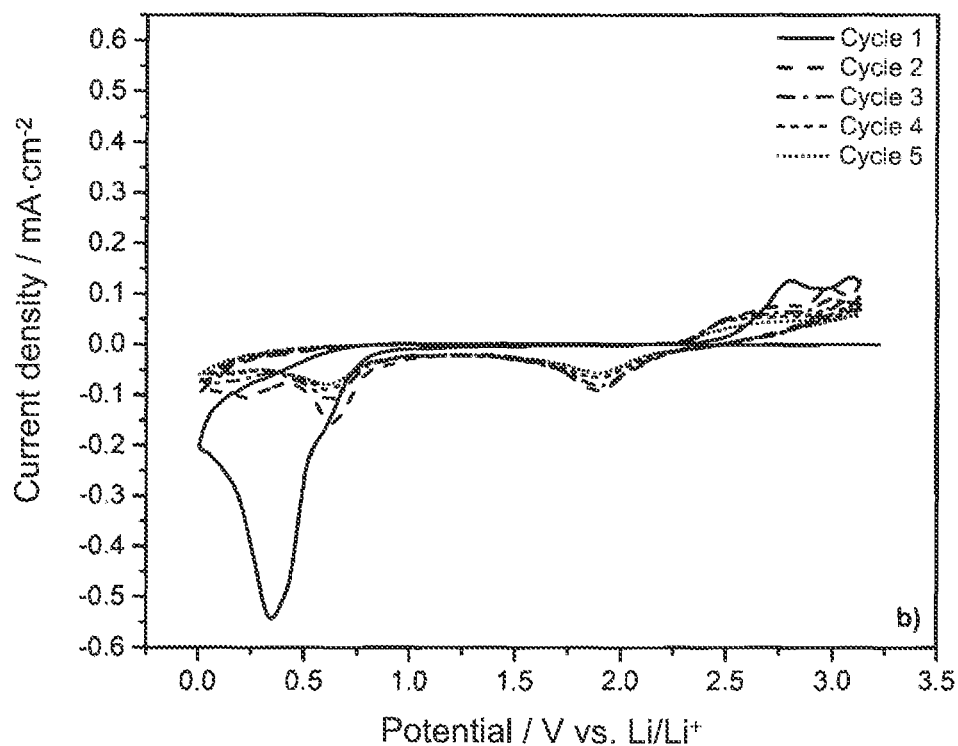
Figure 4:
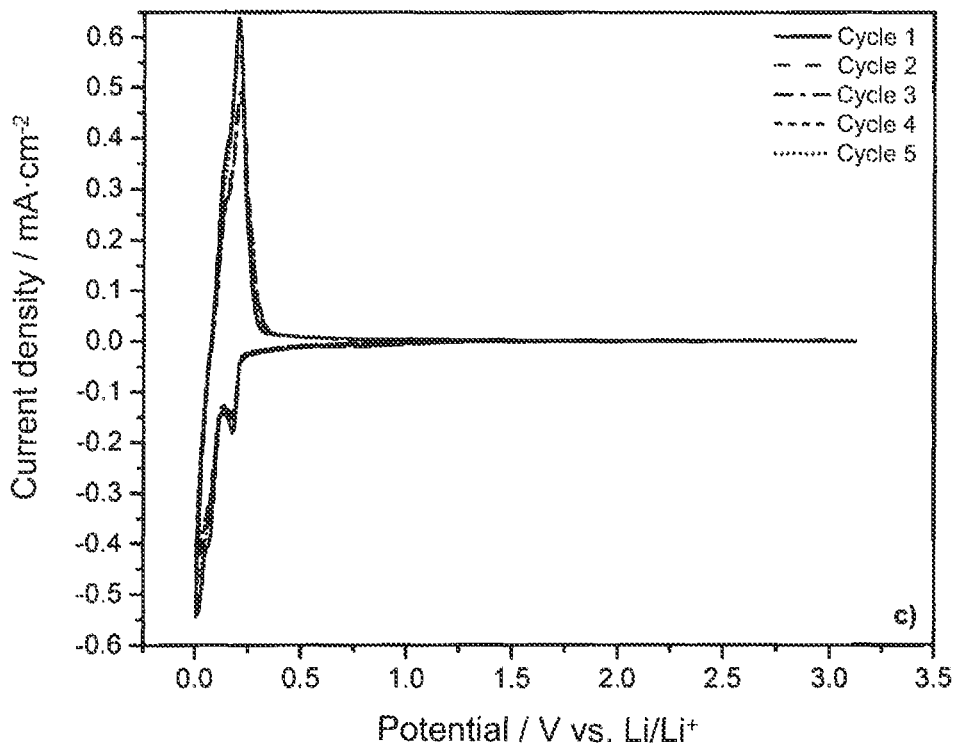
Figure 5:
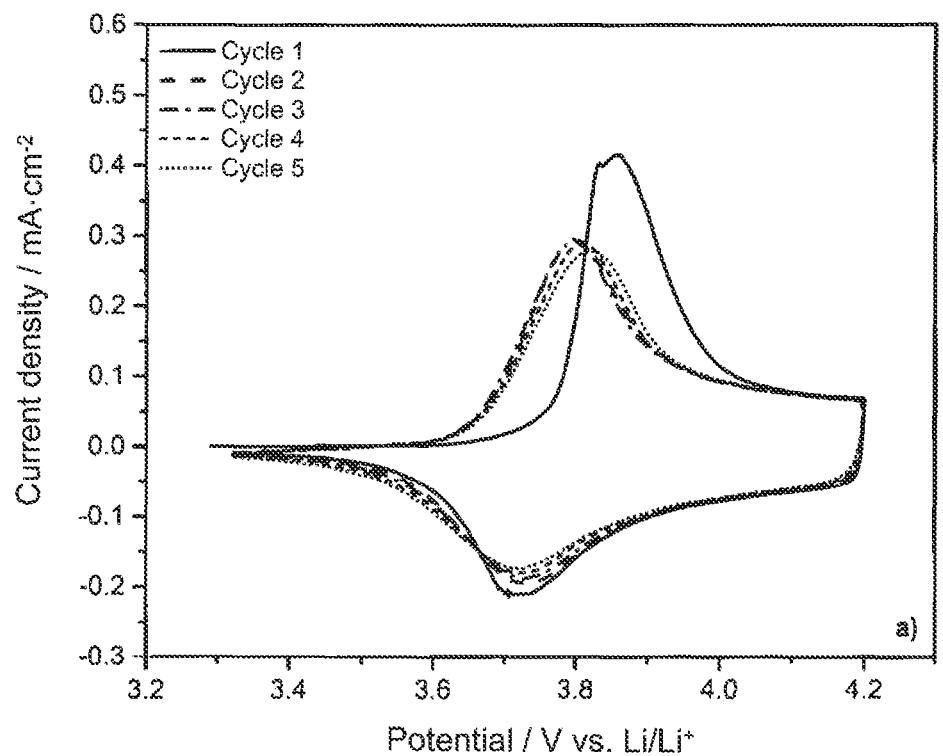
FIG. 5 a): Cyclic voltammograms of Li/NCM111 cells comprising 1 M $LiPF_6$ in propylene carbonate.
Figure 5:
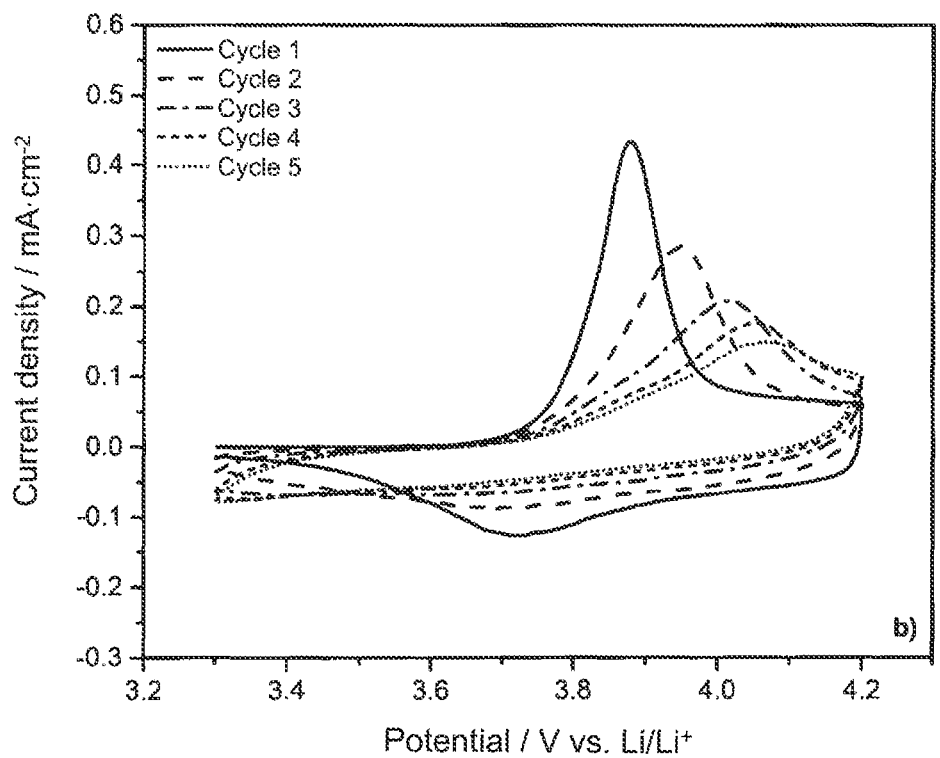
Figure 5:
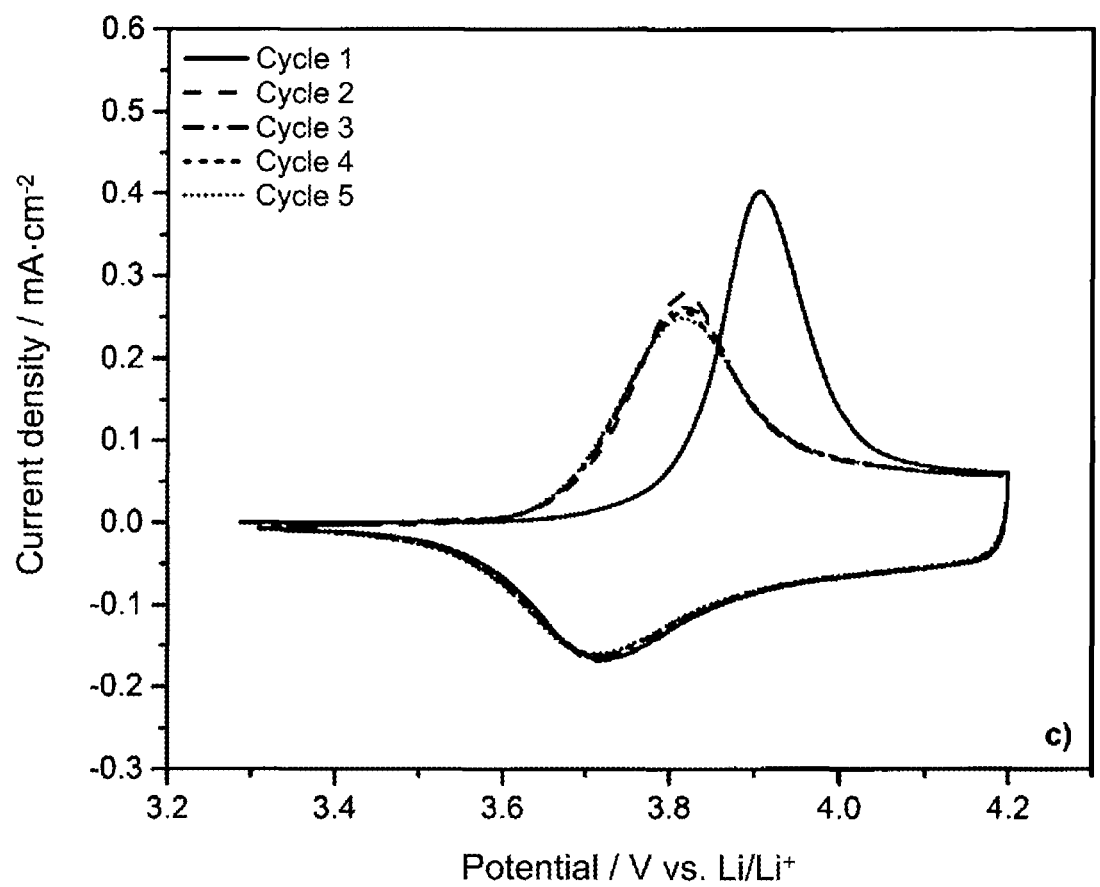

To demonstrate the stability of the electrolytes to graphite and NCM111, cyclic voltammetry experiments were performed using a VMP3 (BioLogic Science Instruments). 3-electrode Swagelok cells with graphite or NCM111 as working electrode and lithium metal as counter and reference electrode were used for the study. The stability of graphite was measured at a scan rate of 20 µV/s in the potential range OCP→0.005 V vs. Li/Li+, of NCM111 in the range OCP→4.2 V vs. li/li+. The results are shown in FIG. 4 (for li/graphite cells) and FIG. 5 (for li/NCM111 cells), respectively.

It was shown that the electrolytes according to the invention are generally stable towards graphite (FIG. 4c) and NCM111 (FIG. 5c). No decomposition could be observed at higher potentials than propylene carbonate (>0.8 V vs. Li/Li+). Propylene carbonate and tetrahydrothiophene-1-oxide as sole solvents decompose at ~0.8 V vs. Li/Li+, leading to exfoliation of graphite in the case of propylene carbonate (FIG. 4a), while the tetrahydrothiophene-1-oxide molecules and/or their decomposition products suppress reversible de/intercalation of lithium (FIG. 4b). Propylene carbonate as sole solvent is compatible with NCM111 (FIG. 5a), which is not the case for tetrahydrothiophene-1-oxide (FIG. 5b).

Figure 7:
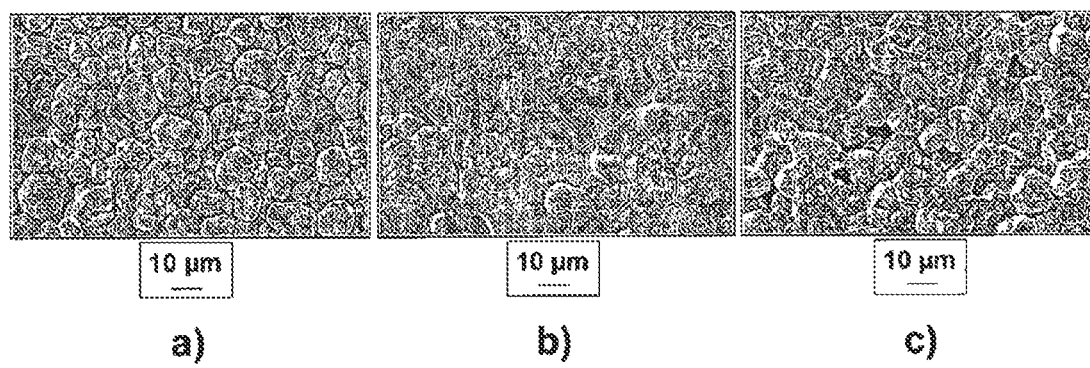
FIG. 7: Results of scanning electron microscopy studies of graphite and NCM111 a) before cycling, b) after 3 forming cycles, and c) after 103 cycles.

In order to analyze the surface morphology of the graphite and NCM111 electrodes before and after cyclization, scanning electron micrographs were taken with a Carl Zeiss AURIGA SEM microscope (Carl Zeiss Microscopy GmbH) (see FIG. 7). The electrodes were removed from the cells in the dry room (water content <30 ppm) and washed three times with 500 µl dimethyl carbonate.

With the aid of the scanning electron microscope, the secondary particles of the active material could be clearly seen on the graphite electrodes before cycling (FIG. 7a), while after cycling, a protective anode layer (SEI) could be observed on the graphite electrodes. After 3 forming cycles, this covers the entire surface of the electrode (FIG. 7b), while after 100 cycles it has nestled around the individual secondary particles of the active material (FIG. 7c). No visible change could be detected in the NCM111 electrodes.

Figure 8:
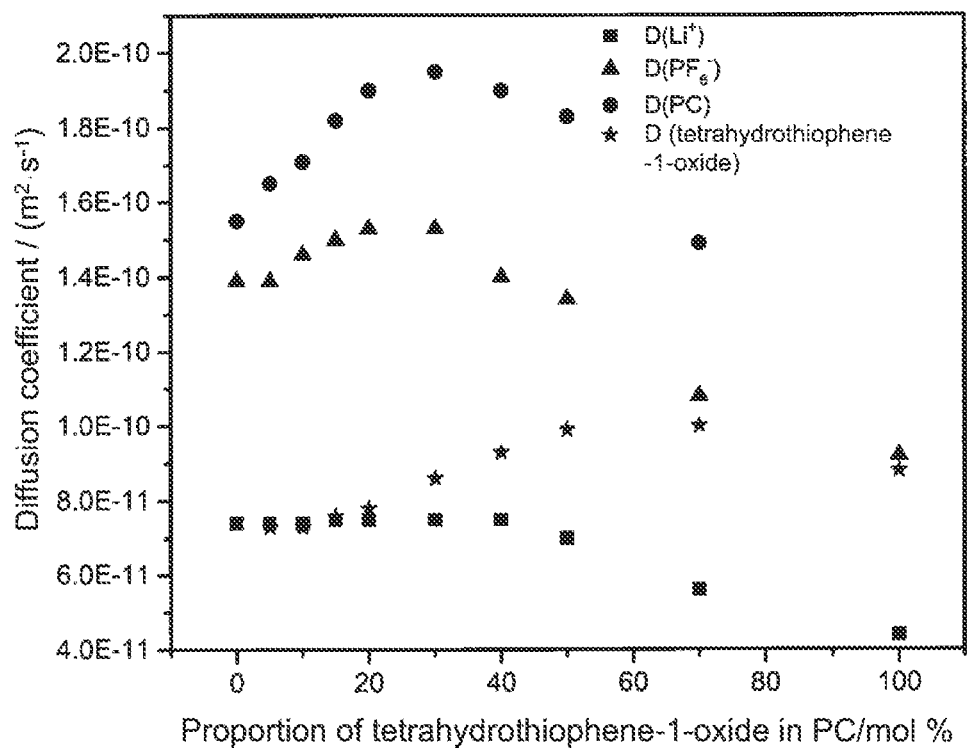
FIG. 8: Self-diffusion coefficients of the species present in the electrolyte using the system as an example: PC/tetrahydrothiophene-1-oxide with $LiPF_6$.

The self-diffusion coefficients of the species present in the electrolyte were determined by pulsed field gradient nuclear magnetic resonance (PFG-NMR) spectroscopy. Measurements were carried out with stimulated echo sequences on a Bruker AVANCE III 200 spectrometer, wherein a Bruker Diff50 probe head equipped with a $^7Li/^1H$ and $^{19}F$. coil (5 mm) was used at 25° C. (stabilized at ±0.1° C.). Gradient strengths were varied from 5-1800 G/cm. The gradient pulse length was 1 ms and the diffusion time 40 ms. The results are shown in FIG. 8. Propylene carbonate molecules exhibit the highest self-diffusion coefficients and show the same trend as the ionic conductivities, i.e., with $LiPF_6$ a maximum value of $1.95 \cdot 10^{-10}$ $m^2 \cdot s^{-1}$ with 30 mol % tetrahydrothiophene-1-oxide and decreasing self-diffusion coefficients when more or less tetrahydrothiophene-1-oxide or propylene carbonate is present. The self-diffusion coefficients of $PF_6^-$ anions show comparable behavior but with a less prominent increase for 0-30 mol % tetrahydrothiophene-1-oxide. The $Li^+$ ions represent the slowest species in the electrolyte. The contributions of $Li^+$ and $PF_6^-$ ions lead to the observed behavior of ionic conductivities.

Figure 9:
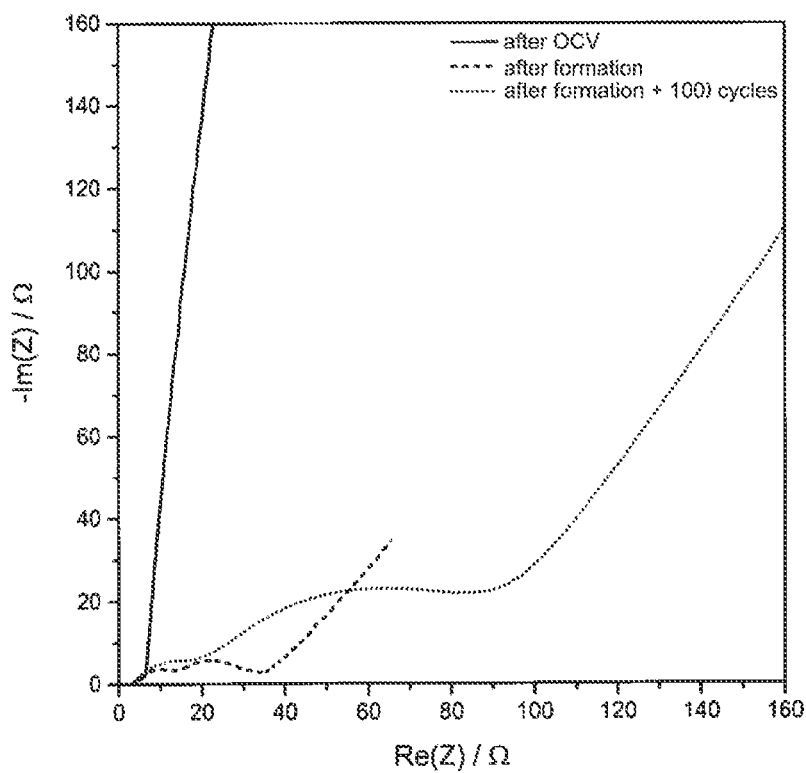
FIG. 9 a): Electrochemical impedance measurements to determine resistances of protective layers on the electrodes after 24 hours of open-circuit voltage, after 3 formation cycles, and after another 100 cycles, in graphite/graphite cells.
Figure 9:
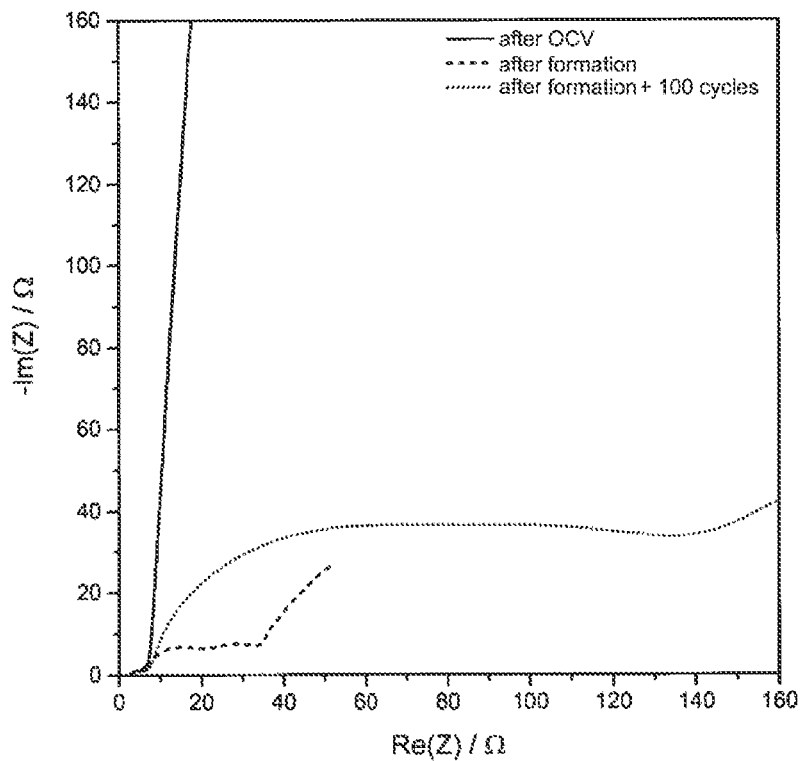
Figure 9:
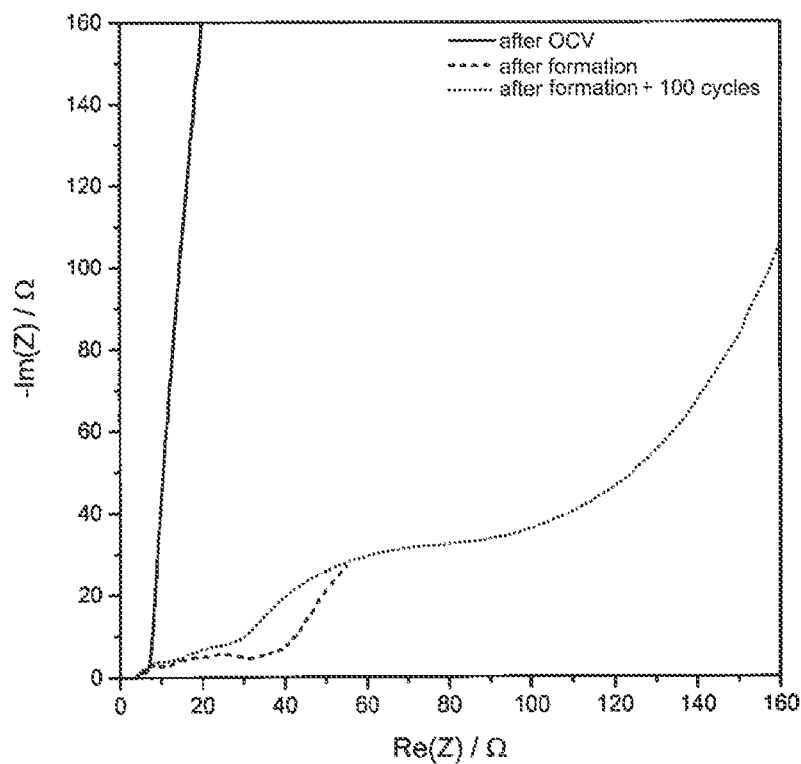

Furthermore, electrochemical impedance measurements were carried out using a VMP3 (BioLogic Science Instruments) in order to examine the resistances of the protective layers. To this end, symmetrical graphite/graphite (a) and NCM111/NCM111 (b) button cells and graphite NCM111 (c) cells were fabricated and measured in a frequency range from 100 kHz to 10 mHz. The graphite and NCM111 electrodes were removed from cells after 24 hours of open-circuit voltage (OCV), after three formation cycles at 0.2 C, or after another 100 cycles at 1 C. The resistances were obtained by adjusting the impedance curves in the Nyquist graph. The Nyquist graph in FIG. 9a clearly shows that there are no protective layers on the graphite electrodes after the open circuit voltage. After being formed, an anode protective layer (SEI) was formed on the graphite electrodes. The sheet resistance rises slightly in the further 100 cycles. The SEI is therefore formed first by galvanostatic cycling and not chemically. The high charge transfer resistances indicate that the layers are electronically insulating and thus have a high organic content. The sharp increase in charge transfer resistances can be attributed not only to increasing film thickness, but also to a change in surface morphology or film composition. FIG. 9b shows that the cathode protective layer (CEI) is also formed by galvanostatic cyclization and the layer thickness increases slowly as the number of cycles increases. The resistances of the CEI are lower than those of the SEI. The charge transfer resistance also increases. The results of impedance measurements with graphite/NCM111 cells (FIG. 9c) show the influence of both layers on the total resistance.

X-ray photoelectron spectroscopy measurements were performed to determine the composition and layer thickness of the protective layers on the electrodes. To this end, the electrodes were inserted into the XPS device (Axis Ultra DLD, Kratos, U.K.) and kept under vacuum for 12 hours. Al $K_\alpha$ radiation with an energy of 1486.3 eV and an emission angle of 0° (cathode) or 45° (anode) was used.

Figure 10:
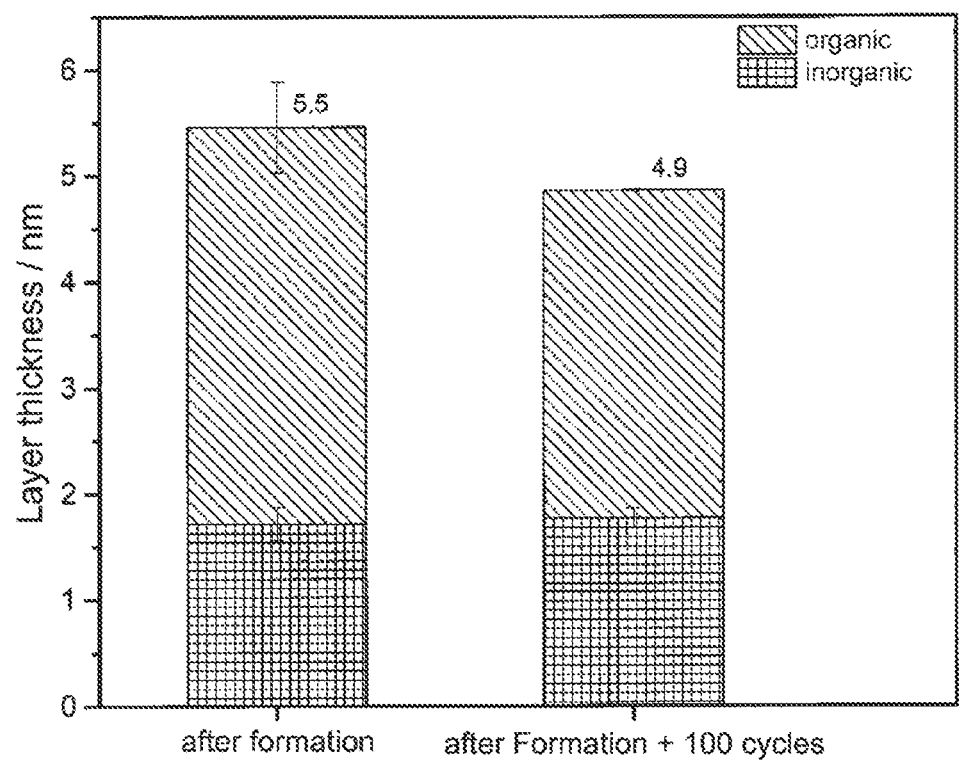
FIG. 10 a): X-ray photoelectron spectroscopy measurements to determine the composition and thickness of protective layers on the electrodes, for a graphite anode.
Figure 10:
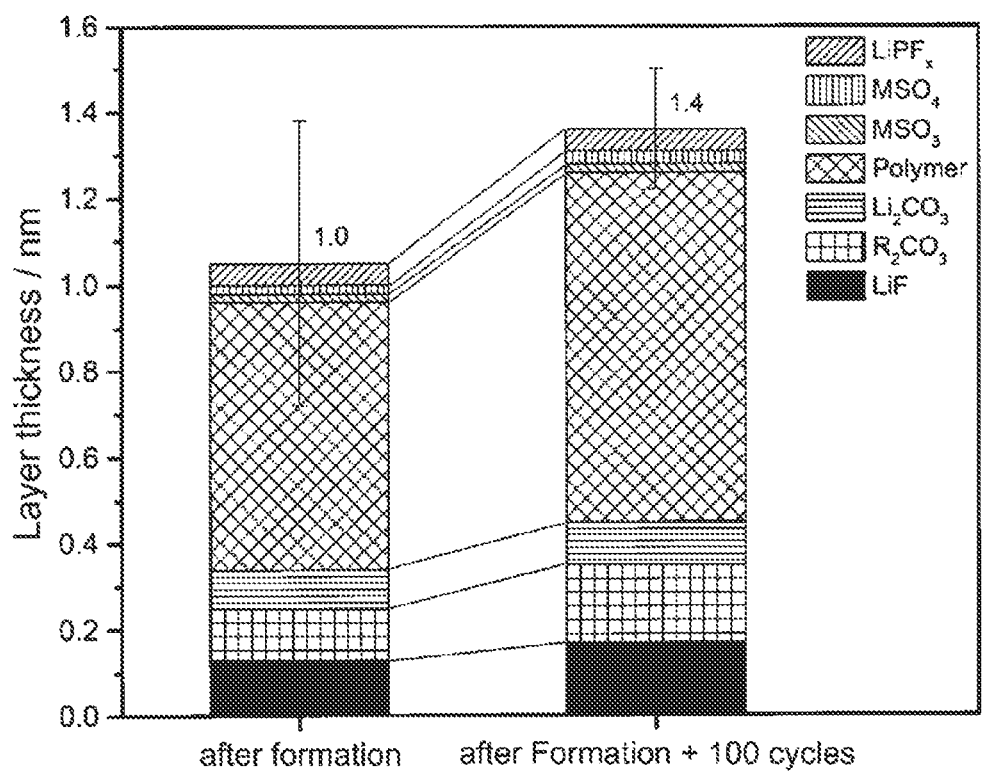

The sputter depth profile for the anodes was performed using a polyatomic ion source (coronene) with a sputter crater ten times the measurement range. Sputtering was performed for 60 s, 120 s and 600 s. For each sample, two or three data points with lateral resolution of 700×300 mm were recorded and arithmetically averaged. The generated spectra were adjusted using CasaXPS Software (version 2.3.16 PR 1.6, Casa Software Ltd., U.K.). The C 1 s C H/C peak (284.5 eV) was used as internal standard for the calibration of the binding energies. FIG. 10 shows the determined compositions a) for the graphite anode and b) for the NCM111 cathode as well as the layer thicknesses. The SEI is ~5 nm thick (5.5 ±0.6 nm after 3 cycles, 4.9±0.1 nm after 103 cycles), whereas the CEI is significantly thinner at ~1 nm (1.0±0.3 nm after 3 cycles, 1.4±0.1 nm after 103 cycles).

The layers were formed almost completely during the forming cycles as no significant change in layer thickness could be observed between 3 and 103 cycles. The organic content of both layers is about 66 At-%, indicating good permeability for $Li^+$ ions. It consists of a polymer with ether groups. The SEI does not comprise sulfur substances, whereas the inorganic part of the CEI includes, among others, metal sulfites and sulfates, which are electronically isolating.

Figure 11:
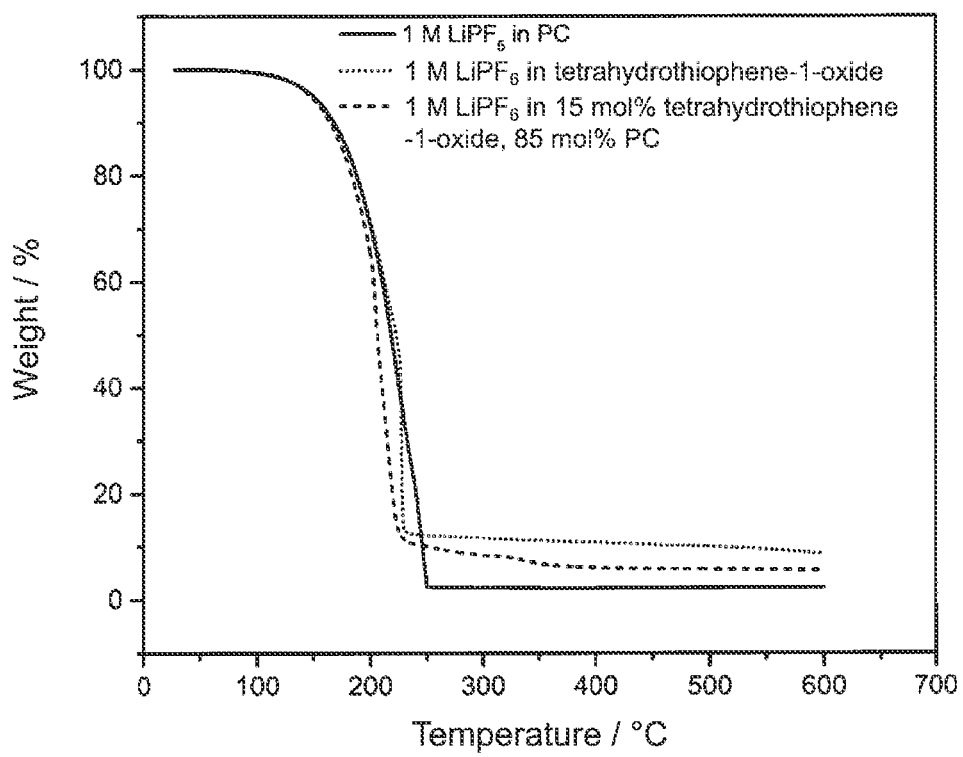
FIG. 11: Thermogravimetric analyses (TGA) of $LiPF_6$ in PC, $LiPF_6$ in PC/tetrahydrothiophene-1-oxide and $LiPF_6$ in tetrahydrothiophene-1-oxide.

Thermogravimetric analyzes (TGA) were performed using a TGA Q5000 meter. Samples were weighed in closed aluminum crucibles. The temperature was raised from 30° C. to 600° C. at 10° C. per minute and the weight of the samples measured. Nitrogen was used as ambient gas. FIG. 11 shows that decomposition of all electrolytes (1 M $LiPF_6$ in PC, 1 M $LiPF_6$ in tetrahydrothiophene-1-oxide and 1 M LiPF$_6$ in 15 mol % tetrahydrothiophene-1-oxide and 85 mol % PC) begins at approximately 120° C.

LITERATURE CITED IN THIS APPLICATION

[1] Ding, M. S. and T. R. Jow, Properties of PC-EA Solvent and Its Solution of LiBOB Comparison of Linear Esters to Linear Carbonates for Use in Lithium Batteries. Journal of the Electrochemical Society, 2005. 152 (6): P. A1199.
[2] Propylene carbonate; SDS no. 310328 [Online]; Sigma-Aldrich Chemie GmbH: Steinheim, Germany, Nov. 25, 2014. http://www.sigmaaldrich.com/safety-center.html (accessed Jun. 10, 2018).
[3] Lee, W. H., cyclic carbonates. The Chemistry of Non-aqueous Solvents, ed. J. J. Logowski. Vol. 4. 1976, New York: Academic Press.
[4] Borodin, O. and G. D. Smith, Development of Many-Body Polarizable Force Fields for Li-Battery Components: 1. Ether, Alkane, and Carbonate-Based Solvents. J. Phys. Chem. B, 2006. 110: p. 6279-6292.
[5] Zhang, S. S., A review on electrolyte additives for lithium-ion batteries. Journal of Power Sources, 2006. 162(2): p. 1379-1394.
[6] European Chemicals Agency (ECHA). 1,3 Propane sultone. Jun. 8, 2018; available from: https://echa.europa.eu/de/substance-information/-/substanceinfo/100.013.017.
[7] European Chemicals Agency (ECHA). Vinylene carbonate. Jun. 15, 2018; available from: https://echa.europa.eu/de/substance-information/-/substanceinfo/100.011.659.
[8] Zhao, H., et al., Propylene Carbonate (PC)-Based Electrolytes with High Coulombic Efficiency for Lithium-Ion Batteries. Journal of the Electrochemical Society, 2014. 161(1): p. A194-A200.
[9] Schmitz, R., et al., Methyl tetrafluoro-2-(methoxy) propionate as co-solvent for propylene carbonate-based electrolytes for lithium-ion batteries. Journal of Power Sources, 2012. 205: p. 408-413.
[10] Nakamura, H., H. Komatsu, and M. Yoshio, Suppression of electrochemical decomposition of propylene carbonate at a graphite anode in lithium-ion cells Journal of Power Sources, 1996. 62: p. 219-222.
[11] Pan, Y., G. Wang, and B. L. Lucht, Cycling performance and surface analysis of Lithium bis(trifluoromethanesulfonyl)imide in propylene carbonate with graphite. Electrochimica Acta, 2016. 217: p. 269-273.
[12] Ethylene carbonate; SDS no. E26258 [Online]; Sigma-Aldrich Chemie GmbH: Steinheim, Germany, Jun. 19, 2018. http://www.sigmaaldrich.com/safety-center.html (accessed Aug. 5, 2018).
[13] 1,2-Butylene carbonate; SDS no. 844007 [Online]; Merck KGaA Darmstadt, Germany, Feb. 19, 2014. http://www.merckgroup.com (accessed Aug. 6, 2018).
[14] Tetrahydrothiophenes-1-oxides; SDS no. T22403 [Online]; Sigma-Aldrich Chemie GmbH: Steinheim, Germany, Jul. 12, 2012. http://www.sigmaaldrich.com/safety-center.html (accessed Jun. 7, 2018).
[15] Qian, Y., et al., Investigations on the electrochemical decomposition of the electrolyte additive vinylene carbonate in Li metal half cells and lithium ion full cells. Journal of Power Sources, 2016. 332: p. 60-71.
[16] Zhu, M., J. Park, and A. M. Sastry, Particle Interaction and Aggregation in Cathode Material of Li-Ion Batteries: A Numerical Study. Journal of the Electrochemical Society, 2011. 158 (10): P. A1155-A1159.
[17] http://ma.ecsdl.org/content/MA2018-02/6/454.abstract.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:
1. A liquid electrolyte for use in lithium-ion, lithium-metal, and lithium-sulfur batteries, wherein the liquid electrolyte comprises:
 at least one organic nonlinear carbonate;
 at least one lithium salt; and
 at least one cyclic sulfoxide,
 wherein the at least one cyclic sulfoxide is present in the liquid electrolyte at a concentration of 15-35 mol % based on total amount of solvent of the liquid electrolyte, and
 wherein the liquid electrolyte does not comprise a combination of propylene carbonate, tetrahydrothiophene-1-oxide, and lithium bis(trifluoromethanesulfonyl)imide (LiTFSI).
2. The liquid electrolyte according to claim 1, wherein the at least one cyclic sulfoxide has 3 to 10 ring carbon atoms.
3. The liquid electrolyte according to claim 2, wherein the at least one cyclic sulfoxide has a structure in accordance with formula (1)

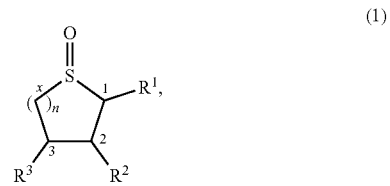

with n=0, 1, 2, 3, 4, 5, 6, 7 and
with R$^1$, R$^2$, R$^3$, R$^4$, R$^5$, R$^6$, R$^7$, R$^8$, R$^9$ and R$^{10}$ each equal to or independently selected from the group consisting of:
 linear or branched alkyl groups with 1 to 12 carbon atoms, linear or branched cycloalkyl groups with 1 to 12 carbon atoms,
aryl groups with 5 to 6 carbon atoms,
aryloxy groups with 5 to 6 carbon atoms,
alkoxy groups with 1 to 12 carbon atoms, wherein the alkoxy groups comprise (poly)alkoxy groups having 5 ethoxy units or less, and
hydrogen.

4. The liquid electrolyte according to claim 1, wherein the ring of the at least one cyclic sulfoxide has one or more carbon-carbon double bonds.

5. The liquid electrolyte according to claim 1, wherein the at least one cyclic sulfoxide comprises:
tetrahydrothiophene-1-oxide,
thietane-1-oxide,
tetrahydro-2H-thiopyran-1-oxide,
thiepane-1-oxide,
2-methyltetrahydrothiophene-1-oxide,
3-methyltetrahydrothiophene-1-oxide,
2-isopropyltetrahydrothiophene-1-oxide, or
3-isopropyltetrahydrothiophene-1-oxide.

6. The liquid electrolyte according to claim 1, wherein the at least one organic nonlinear carbonate comprises propylene carbonate, ethylene carbonate, 1,2-butylene carbonate, 2,3-butylene carbonate, 1,2-pentylene carbonate, 2,3-pentylene carbonate, 1,2-hexylene carbonate, 1,2-octylene carbonate or 1,2-dodecylene carbonate.

7. The liquid electrolyte according to claim 1, wherein the liquid electrolyte has an ionic conductivity of 3.6-7.0 mS $cm^{-1}$ at 25° C.

8. The liquid electrolyte according to claim 1, wherein the liquid electrolyte has an ionic conductivity of 0.9-1.6 mS $cm^{-1}$ at −20° C.

9. The liquid electrolyte according to claim 1, wherein the liquid electrolyte has a viscosity of 6.4-10.0 mPa at 25° C.

10. The liquid electrolyte according to claim 1, wherein the liquid electrolyte has a viscosity of 28.1-45.0 mPa at −20° C.

11. The liquid electrolyte according to claim 1, wherein the liquid electrolyte is compatible with carbon-based electrodes.

12. The liquid electrolyte according to claim 1, wherein the liquid electrolyte is compatible with transition metal electrodes.

13. The liquid electrolyte according to claim 1, wherein the liquid electrolyte has an electrochemical stability of at least 4.2 V vs. Li/Li+.

14. The liquid electrolyte according to claim 1, wherein the at least one lithium salt is selected from the group consisting of:
Lithium hexafluorophosphate ($LiPF_6$),
Lithium tetrafluoroborate ($LiBF_4$),
Lithium perchlorate ($LiClO_4$),
Lithium hexafluoroarsenate(V) ($LiAsF_6$),
Lithium trifluoromethanesulfonate ($LiCF_3SO_3$),
Lithium tris(trifluoromethylsulfonyl)methanide (Li-TFSM),
Lithium bis(oxalato)borate (LiBOB),
Lithium oxalyldifluoroborate ($LiBF_2C_2O_4$),
Lithium nitrate ($LiNO_3$),
Lithium fluoroalkyl phosphate ($LiPF_3(CF_2CF_3)_3$),
Lithium bisperfluoroethysulfonyl imide (LiBETI), and
any combination of these salts.

15. The liquid electrolyte according to claim 1, wherein the at least one lithium salt is present in the liquid electrolyte individually or as a mixture in a concentration of 0.01-22 mol/L or in a concentration of 0.1 to 10 mol/L.

16. A lithium secondary battery comprising an anode, a cathode, a separator, and the liquid electrolyte according to claim 1.

17. The lithium secondary battery according to claim 6, wherein the anode comprises a carbon-based anode and the cathode comprises a transition metal-based cathode.

18. The lithium secondary battery according to claim 6, wherein the lithium secondary battery comprises a lithium ion battery, a rechargeable lithium metal battery, a lithium sulfur battery, a lithium air battery, an alkali metal battery, or an alkaline earth metal battery.

19. The lithium secondary battery according to claim 6, wherein the lithium secondary battery exhibits stable cycling at charge and discharge currents of at least 1 C with specific capacities of at least 95 mA h $g^{-1}$ over at least 100 cycles.

20. The lithium secondary battery according to claim 6, wherein the lithium secondary battery has at least 95% of initial capacity after 100 cycles at charge and discharge currents of at least 1 C.

21. The liquid electrolyte according to claim 1, wherein the at least one cyclic sulfoxide does not contain any linear carbonates.

* * * * *